Sept. 6, 1966 G. VALENSI 3,271,511
COLOUR TELEVISION TRANSMISSION SYSTEM FOR TRANSMISSION
BY MEANS OF AT LEAST ONE SATELLITE
Filed Oct. 30, 1962 11 Sheets-Sheet 1

INVENTOR.
GEORGES VALENSI
By Kurt Kelman
agent

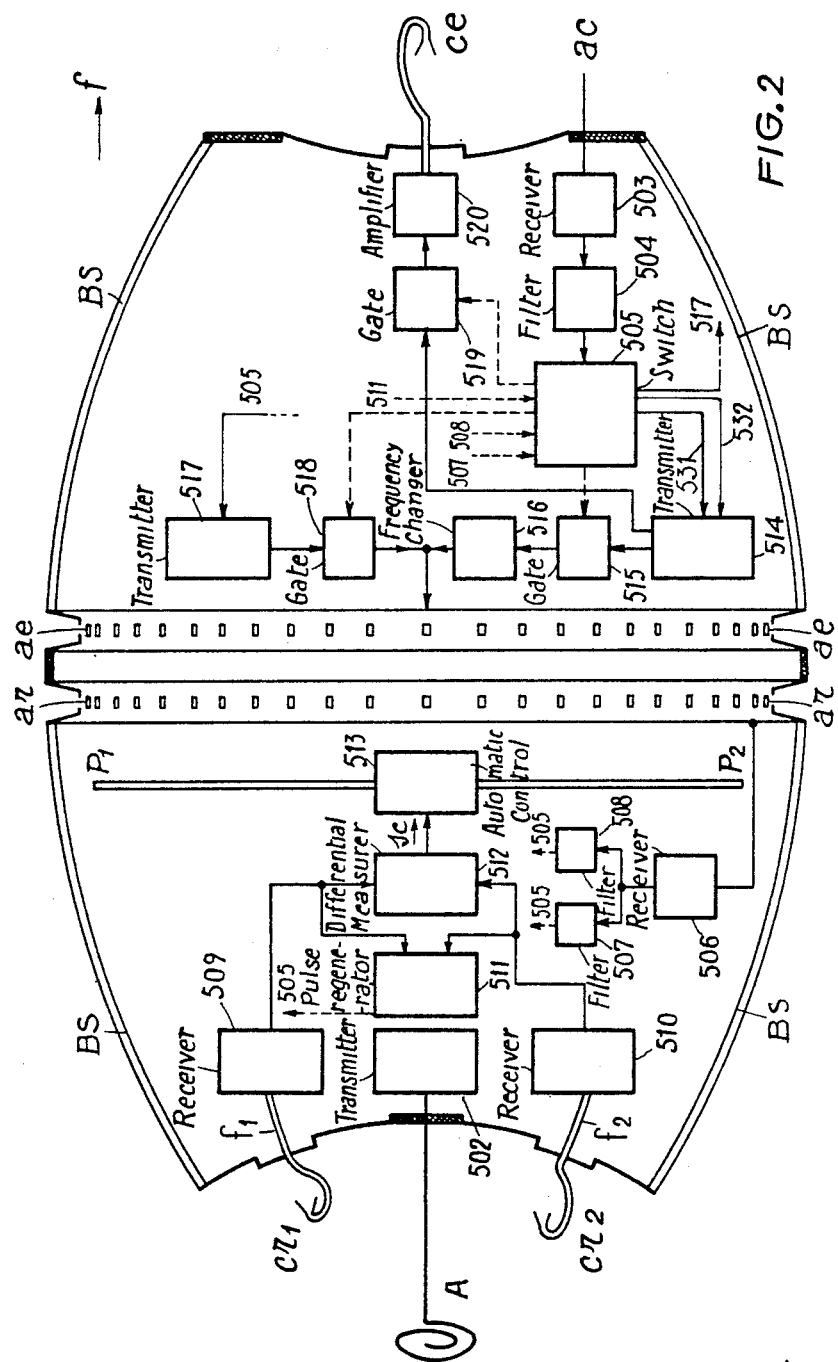

Sept. 6, 1966 G. VALENSI 3,271,511
COLOUR TELEVISION TRANSMISSION SYSTEM FOR TRANSMISSION
BY MEANS OF AT LEAST ONE SATELLITE
Filed Oct. 30, 1962 11 Sheets-Sheet 3
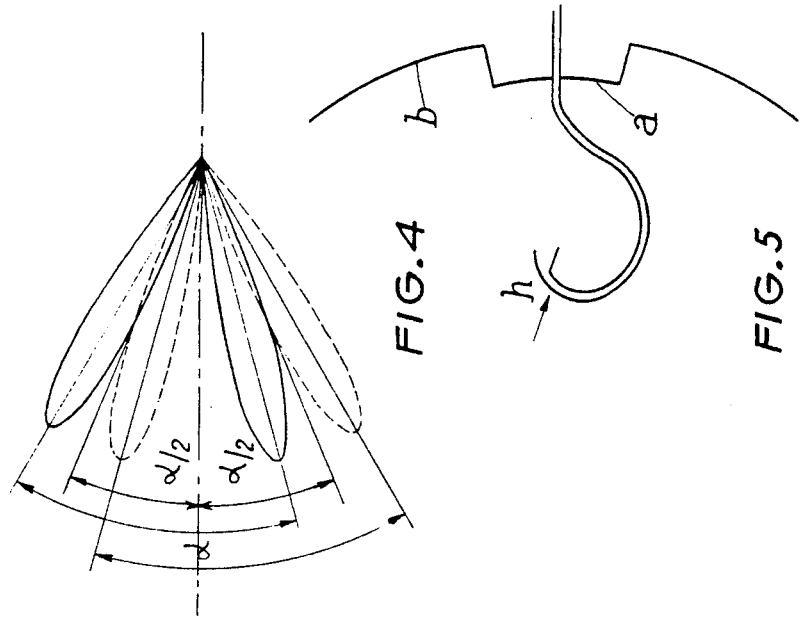
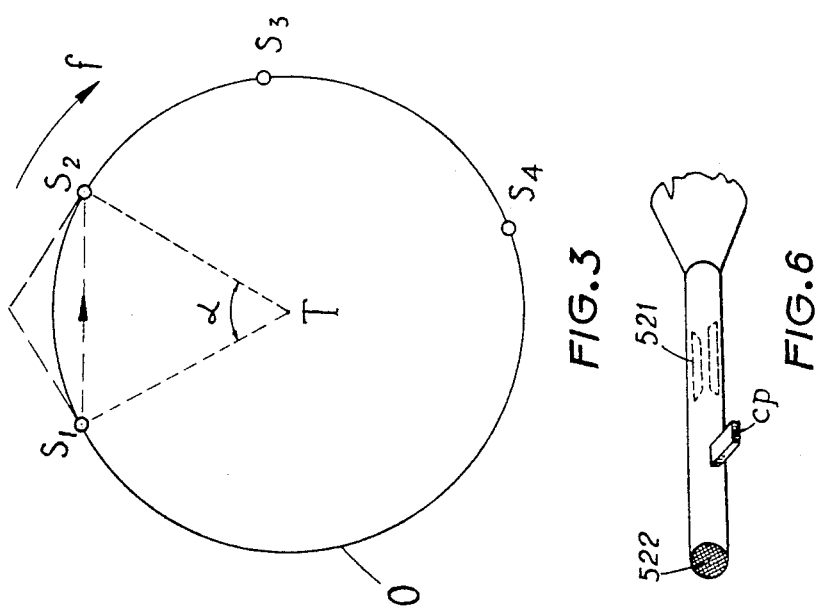
INVENTOR.
GEORGES VALENSI
By Kurt Kelman
AGENT

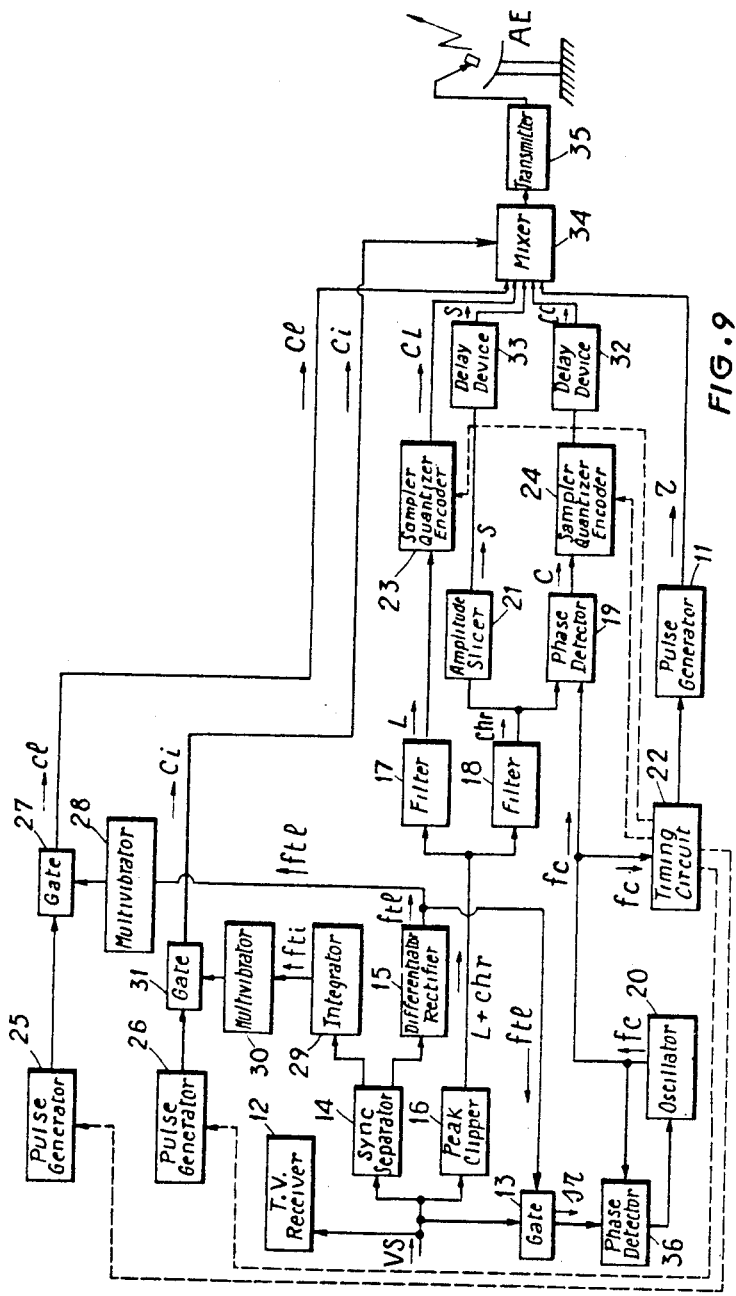

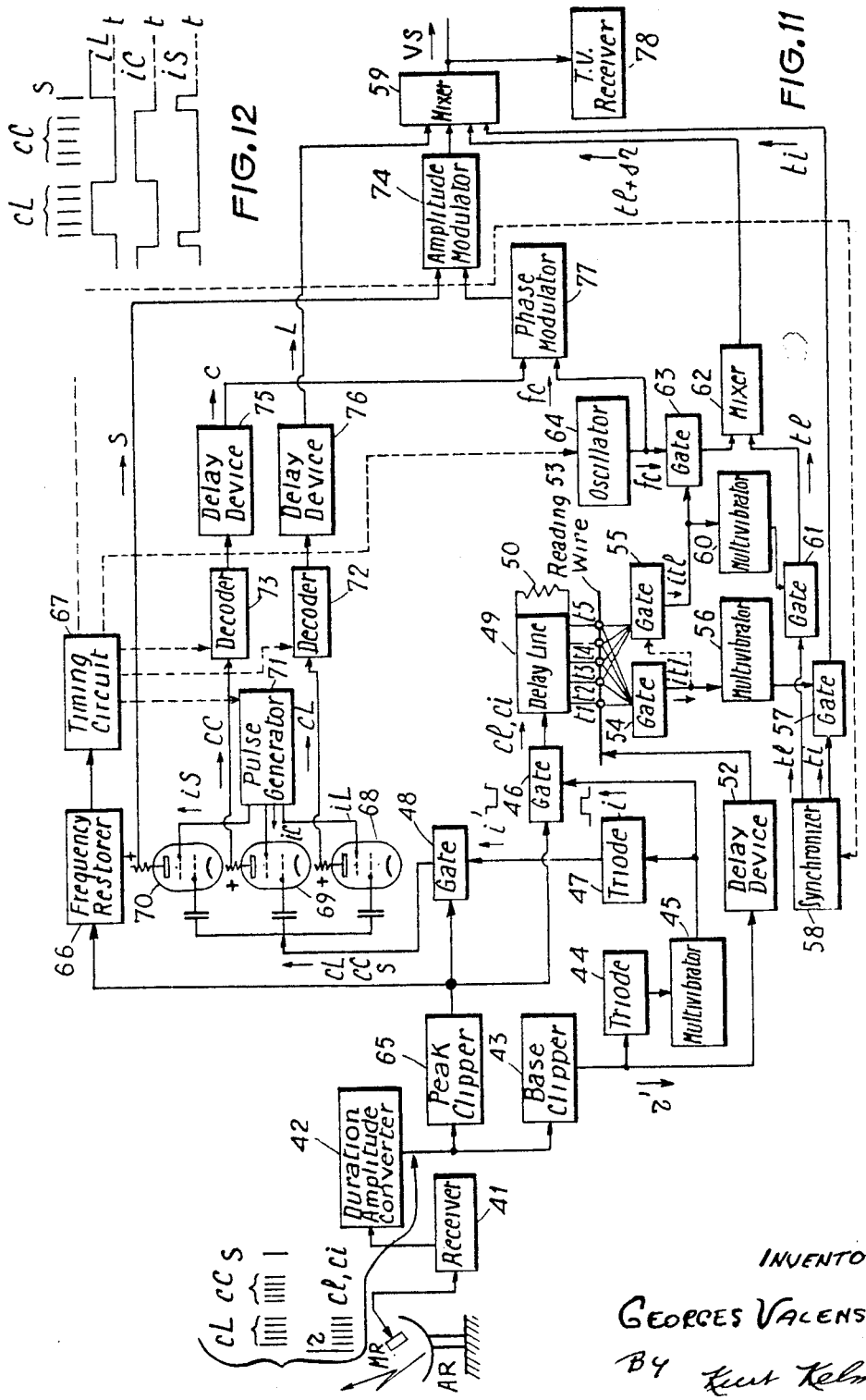

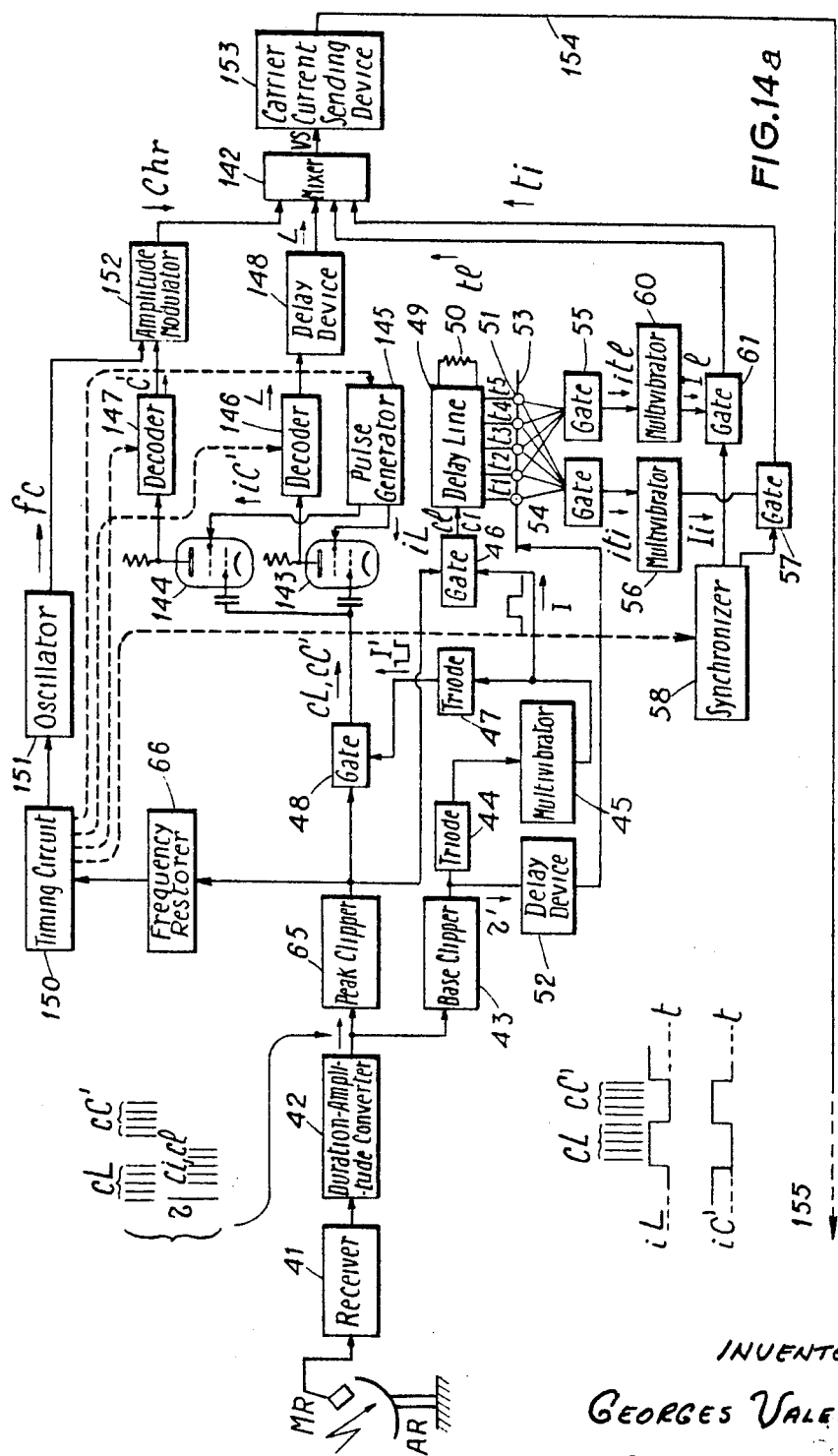

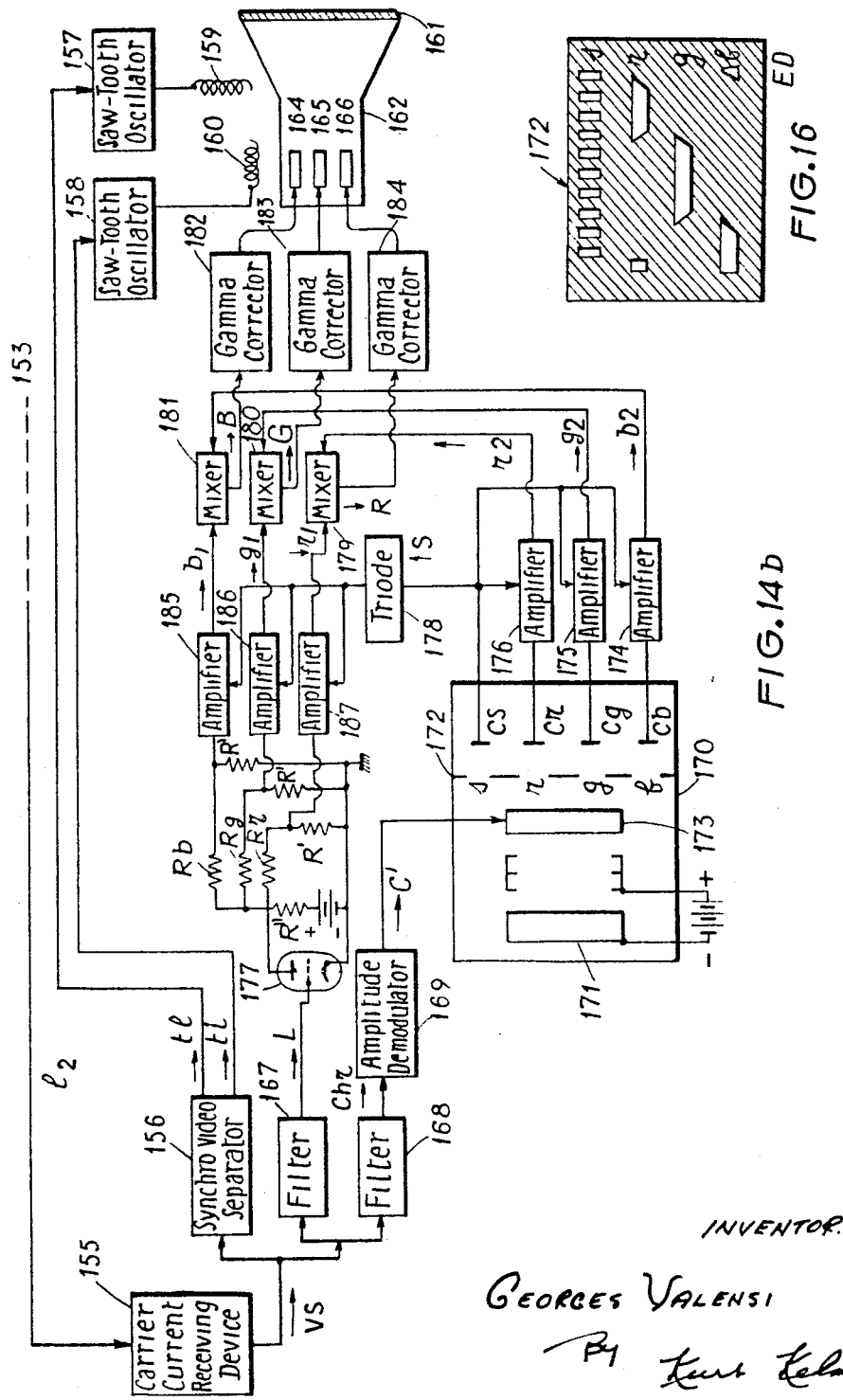

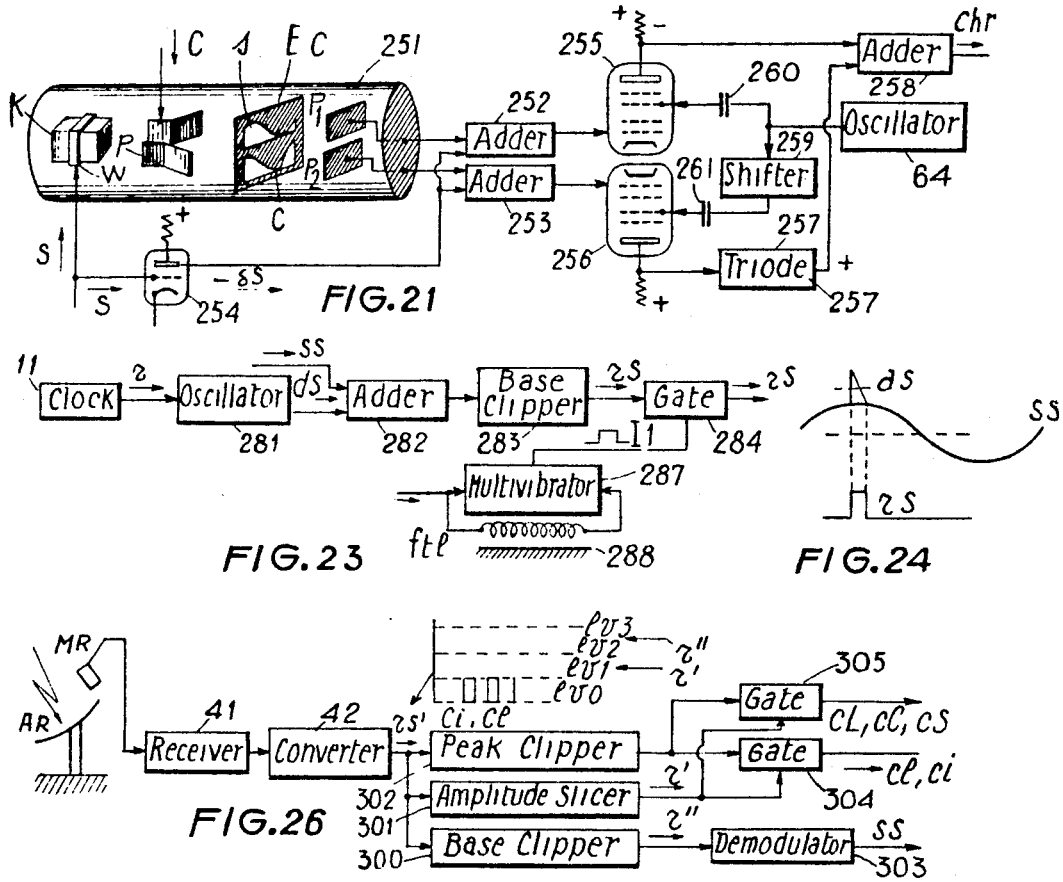
FIG.21
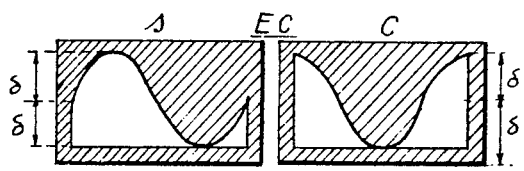
FIG.23
FIG.24
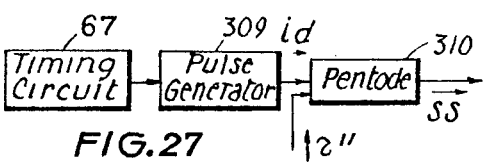
FIG.26
FIG.22
FIG.27
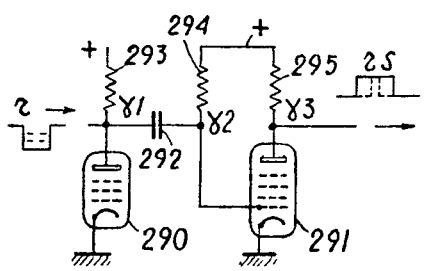
FIG.25
INVENTOR.
GEORGES VALENSI
BY Kurt Kelman
AGENT

United States Patent Office 3,271,511
Patented Sept. 6, 1966

3,271,511
COLOUR TELEVISION TRANSMISSION SYSTEM FOR TRANSMISSION BY MEANS OF AT LEAST ONE SATELLITE
Georges Valensi, 3 Rue des Chaudronniers, Geneva, Switzerland
Filed Oct. 30, 1962, Ser. No. 234,194
Claims priority, application France, Nov. 3, 1961, 877,869; Nov. 29, 1961, 880,301; May 28, 1962, 898,897; July 13, 1962, 903,961; Sept. 21, 1962, 910,062
11 Claims. (Cl. 178—5.2)

The invention has for its object a colour television transmission system for transmission by means of an artificial satellite or of a chain of satellites, the latter of which may in particular comprise:

(1) A multiple relay system for the transmission of the corresponding television signals over a very long distance.

(2) One or more single relay systems for the transmission of other signals over shorter ranges.

The colour television signals are transmitted in a pulse code modulation system requiring only a frequency bandwidth compatible with the possibilities of the maser amplifiers of the ground receiving station.

The invention will be explained with reference to the appended figures wherein:

FIG. 2 shows very diagrammatically a satellite used in the system of FIGURE 1;

FIG. 3 is a graph illustrating the operation of the system of FIGURE 1;

FIG. 4 is the radiation pattern of aerials used in the satellite of FIGURE 2;

FIG. 5 is an aerial providing the radiation pattern of FIGURE 4;

FIG. 6 is a detail of FIGURE 2;

FIG. 9 is the block diagram of a colour television ground transmitting station according to the invention;

FIG. 11 is the ground receiving station associated with the transmitting station of FIG. 9;

FIG. 12 shows graphs illustrating the operation of the receiving station of FIGURE 11;

Figure 15:
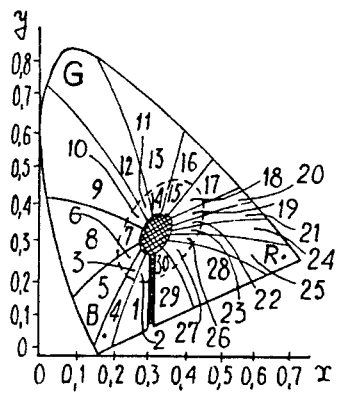
Figure 13:
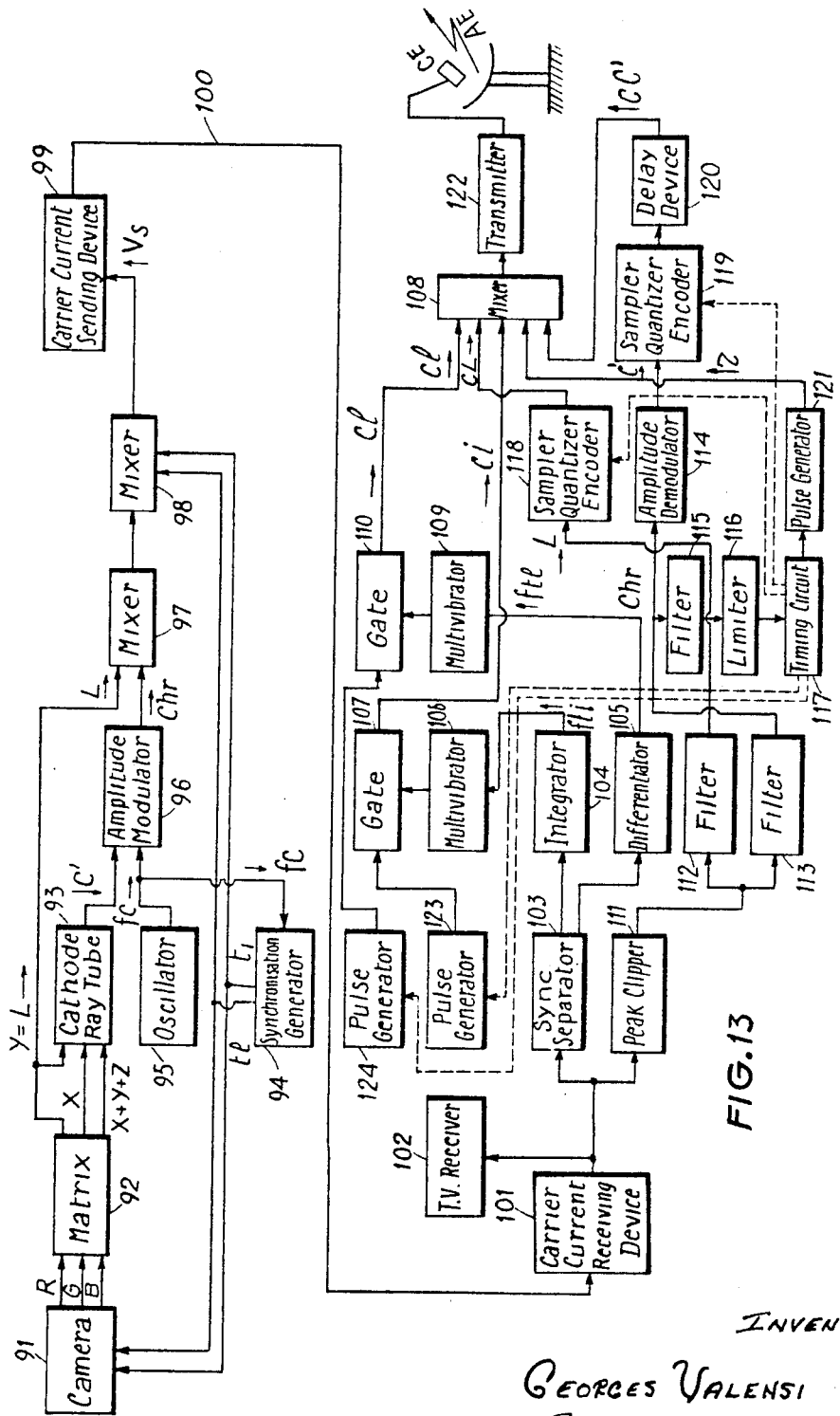
FIG. 13 is a block diagram of another color television ground transmitting system according to the invention.
Figure 17:
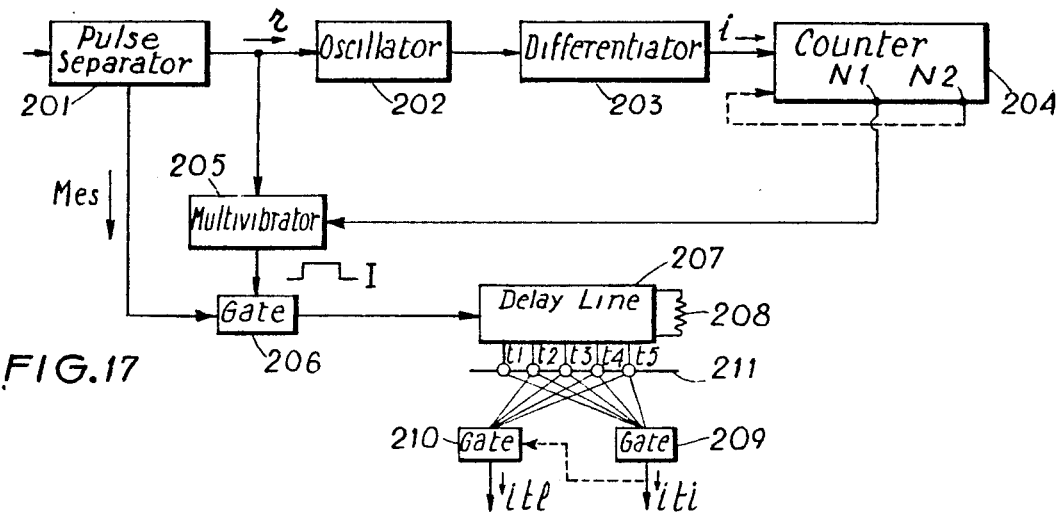
Figure 19:
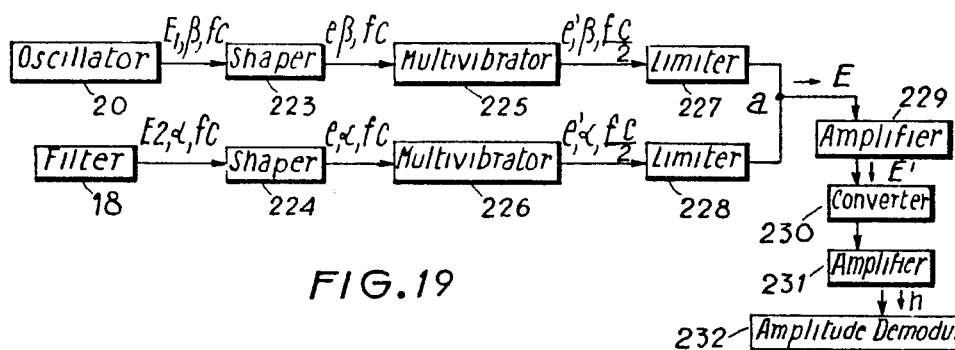
Figure 20:
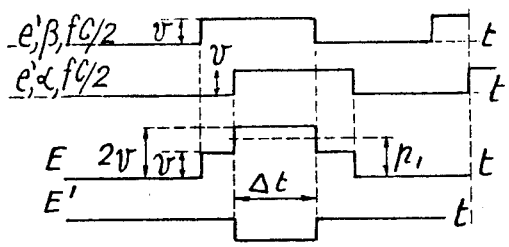
Figure 18:
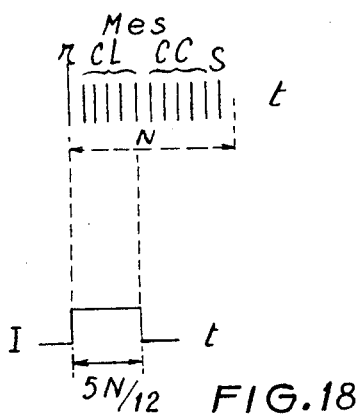

FIGS. 14a and b illustrates the ground receiving system associated with the transmitting system of FIG. 13;

FIG. 15 is a mapping of the colour triangle illustrating the operation of the system of FIGS. 13 and 14;

FIG. 16 illustrates a detail of FIGURE 14b;

FIG. 17 illustrates a detail of the ground receiving stations of FIGURES 11 and 14;

FIG. 18 is a graph illustrating the operation of the device shown in FIGURE 17;

FIG. 19 is a detail of the circuits of FIGURE 9;

FIG. 20 shows graphs illustrating the operation of the system of FIGURE 19;

FIG. 21 is a detail of the circuit of FIGURE 11;

FIG. 22 is an enlarged view of a detail of FIGURE 2;

FIG. 23 shows a sound transmitting circuit associated with the colour television transmission system according to the invention;

FIG. 24 is a graph illustrating the operation of the circuit of FIGURE 23;

FIG. 25 illustrates a modification of the circuit of FIG. 23;

FIG. 26 is the sound receiving circuit associated with the sound transmitting circuit of FIG. 23 or 25; and FIG. 27 illustrates a detail of FIGURE 26.

Figure 1:
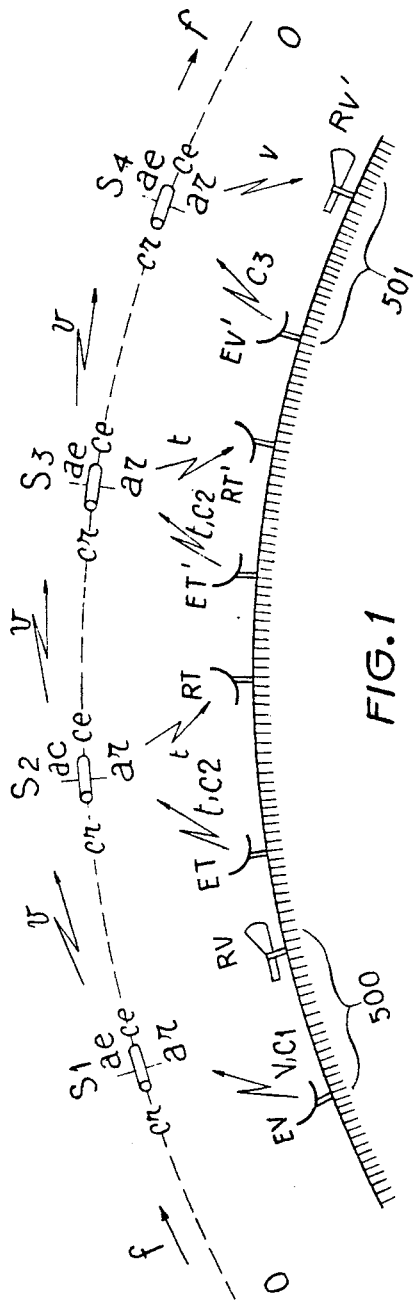
FIG. 1 illustrates a radio relay system according to the invention.

FIG. 1 shows a combined relay system according to the invention wherein, through the use of different frequency bands and suitable polarizations, a long distance multiple relay system may be superposed upon shorter range single relay systems.

It will be assumed, by way of example, that, the longer range system being used for the transmission of the television signals, the shorter range systems are for the transmission of telephone communications.

In FIG. 1, EV symbolizes the ground television transmitting station, while RV' symbolizes the corresponding ground receiving station. RV is the receiving station belonging to the same ground installation 500 as EV; EV' the transmitting station belonging to the same ground installations 501 as RV'. While EV' has a part to play in the operating mode which is to be described, where signals are transmitted from EV to RV', the same is not true for the receiving station RV which has only been shown for the sake of completeness.

ET is a telephone transmitting station and RT the corresponding receiving station; ET' is another telephone transmitting station and RT' the corresponding receiving station.

S1, S2, S3 and S4 are four successive artificial satellites belonging to a chain of satellites following the same orbit O, which is a low altitude orbit, in the direction indicated by arrow $f$, so that S4 is the first of the four satellites in the direction of motion. The spacing between the satellites is such that two successive satellites are in mutual direct visibility.

It is assumed in the present embodiment that the satellites have an attitude control system maintaining their axis of symmetry tangent to the orbit, and that, if according to known art, a movement of rotation is impressed upon the satellites, for stabilizing purposes, this movement of rotation is about this symmetry axis.

Assuming the satellites to have the positions shown in the figure, the transmission between EV and RV' uses the four successive repeaters S1 to S4, while the transmission between ET and RT uses the single satellite S2, and the transmission between ET' and RT' the single satellite S3.

While the satellites have the position shown:

S1 must therefore receive the television signals from EV and retransmit them towards S2;

S2 must receive the television signals retransmitted by S1 and retransmit them again to S3, while receiving the telephone signals from ET and retransmitting them to RT;

S3 must receive the television signals retransmitted by S2 and transmit them again to S4, while receiving the telephone signals from ET' and retransmitting them to RT';

S4 must receive the television signals retransmitted by S3 and transmit them to RV'.

Four operating modes, the second and the third of which are identical as concerns the part played by the satellite, are thus involved.

It will be readily seen that, as the satellites follow the orbit, each of them has to operate successively according to these four operating modes; i.e., for example when S1, S2, S3 will have the position shown for S2, S3 and S4 and another satellite S0 has come to the position shown for S1, then S0, S1, S2 and S3 will respectively operate according to the first, second, third and fourth modes.

Those respective operating modes are imposed upon the satellites by means of switching signals respectively transmitted by EV, ET and ET', which transmit them in addition to their television or telephone signals, and, as concerns the fourth operating mode, by a switching signal transmitted by EV'.

Those signals are designated respectively by C1, C2 and C3 on FIG. 1, the switching signals transmitted by ET and ET' being identical.

The telecommunication transmissions from ground to the satellites (EV to S1, ET to S2, ET' to S3, are effected in a first radio frequency band centered for example on 1,725 mc./s.

In the present embodiment, two different frequencies within this band are respectively used for the television and telephone signals.

The transmission from the satellites to ground (S2 to RT, S3 to RT', S4 to EV') are effected in a second radio frequency band, centered for example on 4,165 mc./s., the same frequency being used for transmission towards RT and RT'.

As concerns the signals received from ET and ET' the satellites operate thus as conventional repeaters, i.e., retransmit the received signals at a different frequency.

A third radio frequency, lying outside the two aforesaid frequency bands, is preferably used for all the switching signals sent from the different ground transmitting stations.

The transmissions involving a ground station and a satellite are effected with the same polarization, which is preferably rectilinear if a movement of rotation is impressed upon the tangential symmetry axis of the satellites.

Each satellite comprises an antenna system, $ar$, for successively receiving all the information signals transmitted from the ground transmitting stations, and an antenna system, $ae$ for successively retransmitting these signals towards the ground receiving stations.

In FIG. 1, $ae$ and $ar$ are only schematically represented. An example of suitable antenna systems will be given hereinbelow.

An auxiliary aerial (not shown in FIG. 1) is used for receiving the switching signals.

The transmission between two consecutive satellites taking place outside the earth atmosphere, and two consecutive satellites being in mutual direct visibility, very short electromagnetic waves may be used, such as millimeter waves or even shorter wavelengths.

The use of very short wavelength has the following advantage: as the satellites must supply their own energy from solar cells, it is desirable to use aerials allowing a considerable gain, and this in turn requires aerials of large dimension compared with the wavelength. The use of a very short wavelength makes it possible to use high gain aerials of small overall dimensions, which is of course preferable where a satellite is concerned.

Each satellite comprises at its rear an aerial or for receiving the signals from the following satellite and at its front an aerial $ce$ for transmitting the television signals to the preceding satellite.

An elliptical, and preferably circular, polarization is used for the transmission between two satellites.

All the television transmissions along the chain S1 to S4 are effected at the same frequency.

Preferably the television signals are transmitted according to a pulse code modulation system, the advantages of which, where a transmission by means of satellites is involved, will be explained later.

FIG. 2 schematically shows an embodiment of a satellite for use in the system of FIG. 1 which satellite comprises, in addition to the receiving and retransmitting arrangements already mentioned, a system allowing the position of the axis of the satellite to be controlled by the following satellite.

It will be assumed that the satellite of FIG. 2 is $S_2$, all the satellites being identical with respect to what will now be said.

$S_2$ is a barrel-shaped satellite having a movement of rotation about its longitudinal axis impressed to it by the launching motor for stabilization purposes. The energy necessary for its operation is supplied, according to known art, by solar cells BS. These cells cover the envelope of $S_2$ except at both ends.

$ar$ and $ae$ are two rows of microwaves antennas of the radiating slot type, located at the equator of said barrel, the slots being only very schematically indicated. The slot antennas $ae$ and $ar$ may be for example of the type used in the well known satellite called Telstar, which are adapted for rectilinear polarization.

A is a multiple-spiral-antenna ejected out of the barrel only at the moment when the satellite reaches the desired orbit, at the end of the launching period; A is permanently energized by radio transmitter 502, for example at 136 mc./s., and so acts as a radio beacon providing informations about the position of the satellite at each instant, either for the earth general tracking system, or for any individual ground station.

$ac$ is an omnidirectional antenna, tuned for example to 120 mc./s. (By means of a ferrite circulator, $ac$ can, during the launching period, be temporarily energized for acting as an auxiliary radio beacon as long as antenna A is not ejected.)

Antenna $ac$ is used for receiving the switching signals C1, C2, C3 mentioned in connection with FIG. 1 and which consequently are transmitted from the ground stations at the frequency of 120 mc./s. The low frequency signals C1, C2, C3 differ from each other, for example by the amplitude, the frequence or the duration.

According to the invention, the satellite further comprises at its front an aerial $ce$ for retransmission of the television signals at a very high frequency.

With a view towards regulating the position of its polar axis relatively to the orbit, the aerial $cr$ of the satellites of FIG. 1 is substituted by two identical aerials $cr1$ and $cr2$, symmetrically located at the rear of the barrel, their respective axes making symmetrical small angles with the polar axis of the barrel.

Moreover, $ce$, $cr1$ and $cr2$ are all aerials having a conical radiation pattern, for the following reason which will be explained with reference to FIG. 3.

In FIG. 3, T is the center of the earth, and O the circular orbit along which satellites S1, S2, S3, S4 move in the direction of arrow $f$. Assuming first the polar axes of S1 and S2 to be both tangent to the orbit, the angle between the polar axes of S1 and S2 is $\alpha$, and the angle between a polar axis and direction $S_1 S_2$ is $\alpha/2$, where $\alpha$ is the angle between TS1 and TS2, $\alpha$ being for example 30° and TS1=TS2 being for example equal to 7,000 km.

This means that if the main axes of the radiation diagram of S1 and S2 were parallel to the respective polar axes, antennas of the conventional pencil-beam type would require a very large aperture of the beam.

Of course, if the satellites did not rotate about their polar axes, it would suffice to transmit a pencil beam by means of an aerial having its main radiation axis in the direction of S1 S2, but the rotation of the satellite involves the rotation of the aerial, so that this is no solution in the present case. One is thus lead to a conical radiation pattern concentrating the energy transmitted in directions making a mean angle of $\alpha/2$ with the polar axis of the transmitting satellite.

The receiving diagram of $cr1$ and $cr2$ are similar, with this difference that their respective symmetry axes are not along the direction of the polar axis of the satellite, but, as has been mentioned, make small symmetrical angles with it, with a view towards using a method, similar to the lobe comparison method used in radar systems, for regulating the position of the polar axis of the receiving satellite as will now be explained.

In FIG. 4, the straight line represents the polar axis of satellite S2, the two-lobe curve in solid lines represents the meridian section of the 3 db receiving diagram of $cr1$ and the two-lobe curve in dotted lines the meridian section of the 3 db receiving diagram of $cr2$. In this figure, the "thickness" of the conical radiation patterns is somewhat exaggerated. The "thickness" of the conical radiation pattern is calculated so that for the spacing between S1 and S2 on the considered orbit, and the possible angular fluctuations of the polar axis of S2, at least one of the aerial cr1 or cr2 always receives sufficient energy.

It may, for example correspond to an angular aperature of 1°. It will be readily seen that at every instant, only the lower portions (see FIG. 3) of the transmitting and receiving diagrams of the aerials are used.

FIG. 5 shows a possible way of obtaining conical diagrams of the aforesaid type, for ce, cr1 and cr2.

Each of these aerials comprises a horn $h$, and a reflector comprising a central "$a$" portion, and a peripherical "$b$" portion, the meridian sections of which are respectively an arc of a first parabola, and two arcs of a second parabola. These two parabolae have the same axis and the same focus where horn $h$ is located, and the distances of the focus to the summits of the two parabolae differ by $\alpha/4$, where $\alpha$ is the wavelength which is used.

Portions $a$ and $b$ of the reflector are designed so that each receives half of the energy delivered by horn $h$, so that the two portions, each being considered alone, give substantially the same radiation pattern.

Due to the $2 \times \lambda/4 = \lambda/2$ path difference in the direction of the antenna axis, this results in a zero of the radiation pattern in this direction, while the radiation in the neighbouring directions is strongly attenuated.

The parabola arcs are calculated so that a maximum radiation occurs in the directions making an angle substantially equal to $\alpha/2$ with the direction of the aerial axis. If the thickness of the conical beam is 1°, and the wave length 8 mm., the diameter of the larger reflector is about 60 cm.

The circuits connected to these aerials will now be described.

The omnidirectional antenna $ac$ energizes through receiver 503 and frequency filter 504 a switching device 505 controlling the operating mode of the satellite.

The receiving antenna system $ar$ energizes a two channel receiving device 506 with two frequency filters: 507 for telephony and 508 for television which are respectively connected to two inputs of switching device 505, as indicated in dotted lines.

Aerials cr1 and cr2 are connected through two feeders $f1$ and $f2$ to two radio frequency receivers 509 and 510.

Each of these feeders comprises a polarization duplexer represented in FIG. 6 for converting the circularly polarized millimeter wave transmitted by satellite S1 into rectilinearly polarized waves.

Each arrangement comprises, starting from the horn, and inside the feeder, an artificial quarter wave line section 521 by means of which a rectilinearly polarized component is obtained, which is filtered by a polarization-coupler $cp$ connecting the feeder to receiver 509 or 510.

The feeder further comprises a terminal absorbing load 522.

Receivers 509 and 510 thus respectively receive the high frequency energy, received by aerials cr1 and cr2, but converted into linearly polarized waves. The detected output signals of those receivers are added up together at the input of the pulse regenerator 511, whose output is connected to another input of switching device 505 (FIG. 2).

For the position regulating purposes, receivers 509 and 510 feed, in addition to the pulse regenerator 511, a differential measuring instrument 512 which produces at each instant a signal $sc$ which is the difference between the two detected signals applied to its two inputs.

One output of the switching device 505 is connected to a telephone retransmitter 517, which is coupled to aerial system $ae$ through a gate 518. Two other outputs of the switching device 505 are respectively connected to a first input 531 and a second input 532 of a television retransmitter 514 which is coupled to the aerial $ce$ through a gate 519 and an amplifier 520, and to the antenna system $ae$ through a gate 515 and a frequency changer 516.

Gates 519, 515 and 518 are controlled by the switching device 505 through connections in dotted lines.

As long as satellite S1 (FIGURE 1) remains in the range from television transmitter EV, it receives the television signals $v$ and a switching signal C1 which, by means of switching device 505, establishes the connection "filter 508—first input 531 of television transmitter 514—gate 519 open—amplifier 520—aerial ce," gates 518 and 515 being closed.

Retransmitter 514 demodulates the signals received on its first input from filter 508 and retransmits them on a millimeter carrier wave.

The above mentioned connections are maintained as long as the switching signal C2 from transmitter ET is not received by the satellite.

When a satellite comes into the range of the telephone transmitting station ET, it receives on its antenna system $ar$ the telephone signal $t$ and on its antenna $ac$ the switching signal C2 which establishes the two following connections:

(a) For telephony "filter 507—transmitter 517—gate 518 open—aerial $ae$."

(b) And for television; "pulse regenerator 511—second input 532 of transmitter 514—gate 519 open—amplifier 520—aerial ce," gate 515 being closed.

517 is a retransmitter of a conventional type frequency-translating the received telephone signals.

The detected signals received on the second input 532 of transmitter 514 modulate the millimeter carrier wave generated in this transmitter.

These connections are maintained and moreover confirmed by the switching signal C2 received thereafter from ET'.

When the satellite comes into the range of RV', it receives the switching signal C3 which establishes the following connections for television retransmission towards ground: "pulse regenerator 511—second input 532 of transmitter 514, gate 515 open—frequency changer 516—aerial $ae$," gate 518 remaining closed, and gate 519 as well if, as assumed here, the television signals are not to be transmitted further.

Frequency changer 516 transforms the very high frequency signals delivered by transmitter 514 into lower frequency signals adapted for the television ground station RV'.

The operation of the axis position regulating system will now be described.

The difference signal $sc$ delivered by subtracting device 512 is for a given angular position of satellite S2 a function of the angle between the correct position and the real position of the axis of satellite S2, if the axis of satellite S1 is tangent to the orbit.

It moreover varies in accordance with the rotation movement of satellite S2 which involves the rotation of the axes of aerials cr1 and cr2.

This signal is applied to the attitude control device 513 which controls a device schematically represented by two pipes P1 and P2.

The circuit and this device operate in such a way that an exclusive or predominating reception by aerial cr1 causes pipe P1 to be more or less opened, in a measure depending upon the level of the correcting signal, for throwing a gas jet upon an appropriate point of the shell of the satellite, while an exclusive or predominating reception by aerial cr2 causes pipe P2 to be in the same way more or less open for throwing a gas jet upon the opposite point of the shell.

It will be readily seen that the action thus obtained for positioning the axis of satellite S2 remains correct, whatever the angular position of S2 about its axis, because a rotation of the positions of aerials cr1 and cr2 about the satellite axis (which rotation modulates the error signal) is of course associated with a corresponding rotation of the two pipes.

Thus the position of the axis of S2 is automatically corrected for causing the axis of S2 to remain tangent to the orbit. S3 is controlled by S2 in the same manner and so on.

It has been assumed that the axis of S1 was correctly positioned. This result may be obtained by any means well known in the satellite technique, and which are not per se an object of the invention.

The following method will simply be mentioned, by way of example.

The first launched satellite has additional control devices for checking and adjusting from the ground stations of the general tracking system the position of its polar axis with respect to the tangent to the orbit. Light sensitive devices located at the front and at the rear of the barrel are sensitive to the light directly received from the sun or to the light reflected by the surface of the earth and/or to the thermal radiation of the earth. These devices give information which, translated electrically and further retransmitted toward the ground stations of the general tracking system, offer to these stations the possibility of acting upon the aforementioned additional attitude control devices in order to cause the polar axis of the first launched satellite to be tangent to the orbit.

It has been assumed heretofore that the chain of satellites was circulating on a low altitude orbit, so that the satellites are in relative motion with respect to the earth. It will be readily seen that the invention also applies in the case of high altitude satellites rotating on a circular equatorial orbit with a period of 24 hours so that they seem stationary with respect to the earth.

As in the case of low altitude satellites, each satellite comprises the aerials and circuitry necessary for superimposing a multiple relay system for very long distance television to communications systems using only a single stationary satellite.

The switching operation described hereinabove for the case of low altitude satellites will be then added to the various switching operations necessitated for the various telecommunication between the various stations located inside the zone covered by the considered satellite.

In this case the attitude control device (such as 513–P1–P2 in FIG. 2) in one stationary satellite $S_2$ receiving the millimetric waves from the sending satellite $S_1$ (FIG. 1) acts upon the container of receiving aerials $cr_1$, $cr_2$ (FIG. 2) and not on the shell of satellite $S_2$ itself, the attitude of $S_2$ being then independently controlled by a ground station.

The system is of course not limited to the use of satellites such as shown in FIG. 2, to which various modifications, within reach of those skilled in the art, may be imparted.

There will now be described the colour television transmission system, adapted to be used, in particular, in the system described with reference to FIG. 1, and with satellites of the type shown in FIG. 2, i.e. a transmission system using pulse code modulation, while requiring only a frequency bandwidth compatible with the possibilities of maser preamplifiers.

As the source of electric power available on board of an active satellite is, up to now, a group of solar cells producing a power of only a few watts, the relaying of telecommunication signals by means of a satellite repeater has been done heretofore by means of large-excursion-frequency-modulation with feedback, in order to reduce as much as possible the minimum allowable value of the carrier/noise ratio at the input terminals of the maser-preamplifier located at the focus of the large aerial of the receiving radioelectric ground station; in fact a feedback of 20 decibels in a frequency-modulator with a modulation index of 10 improves by 9 decibels the "threshold," that is the minimum allowable value of the carrier/noise ratio, and this large frequency excursion improves the signal to noise ratio at the output of the receiving preamplifier. But this type of modulation necessitates a great occupation of the radioelectric spectrum in the frequency band (1.000 to 10.000 mc./s.), which can be used for satellites and this band is already very encumbered; also it requires that the following conditions be fulfilled: great accuracy of the phase of the output signal applied to the feedback circuit, very good linearity of this feedback circuit, a simplified limiter (without too many reactive elements which would introduce undesired phase-shift), and therefore, an automatic gain control associated with the feedback circuit for adjusting the level of the carrier at the input of the limiter.

These conditions are particularly difficult to meet in case of a colour television transmission system where the colour subcarrier is phase and amplitude modulated by two independent parameters; this is the case for the colour television system now used in the United States of America in which the phase characterizes the hue of the colour, a phase error of $\frac{1}{30}$ (12 degrees over 360) producing a very noticeable colour change in the received picture.

An object of the system to be described is to overcome these difficulties and also to spare the radioelectric spectrum, by using, at least for transmission between the two terminal ground stations, pulse-code modulation in the following conditions: a luminance signal L, and either a hue signal C and a saturation signal S, or a colour signal C′ combining the last two informations, are derived from the video signal before the input of the ground station EV which transmits television to the active satellite, and these signals are transmitted in different channels of a time-division multiplex; the corresponding pulses are received regenerated, and retransmitted by the satellites and finally retransmitted to the receiving ground station RV′ at the output of which is restored the video signal for further transmission over the ground by wire lines or by radio relay links or by broadcasting.

This principle is applied hereafter:

(1) To an intercontinental colour television broadcasting transmission wherein the studio from which the program originates and the ultimate receivers use the NTCS system, i.e. a colour subcarrier phase modulated by the hue, and amplitude modulated by the degree of saturation of the colour;

(2) To a colour television transmission between two private stations, both using the system based on the mapping of the colour triangle, with a colour subcarrier which is only amplitude modulated by a voltage proportional to the number of the triangle sector corresponding to the transmitted colour.

The first example of application of the system described hereafter concerns a colour television transmission wherein the original video signal is of the NTSC type, i.e. comprises a luminance signal L and a colour subcarrier, both phase modulated and amplitude modulated.

Figure 7:
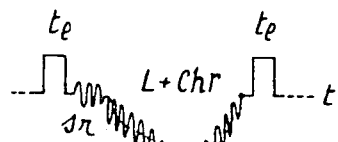
FIG. 7 shows the wave form of a colour television video signal.

The known method of applying pulse code modulation to this case would be to sample, quantize and encode the wave shape of the video signal (FIG. 7).

It will be assumed that in the American pick-up studio, cameras adapted to the European standards are used (625 lines; 50 fields, corresponding to 25 pictures, per second; a colour subcarrier at 4.43 mc./s). The phase and amplitude modulation of the subcarrier makes it necessary (for each period of said subcarrier corresponding to one point of the television scene) to sample 4 ordinates: the maxima and minima of the solid line on FIG. 7 and the two crossings of this solid line with the dotted line (luminance signal). For a quantization accuracy of 1%, seven coded pulses should correspond to each sampled ordinate; therefore, the number of independent pulses per second would be: $4 \times 7 \times 4.43 \cdot 10^6 = 124$ millions for the assumed standards.

If, in a general way, the number of such independent pulses per second is 2F, the corresponding function of time can theoretically be transmitted through a channel having a bandwidth F. Consequently, the maser-preamplifier of the ground station should have, at least a bandwidth of 124/2=62 mc./s. But the theoretical band of a ruby-maser (refrigerated with liquid helium) is only 50 mc./s. and practically only half of that can be used now; the improvements being studied could perhaps allow a practical band of 35 mc./s.

Another method is the transmission, through three channels of a time-division-multiplex, of three parameters characterizing each point of the televised scene, the wave shapes of the time variations of these parameters being sampled and encoded at the rate of seven pulses per parameter and per point of the televised scene; these parameters may be either the three primary signals (blue B, green G, red R), or the luminance signal Y and the colour-difference-signals $(B-Y)$ and $(R-Y)$, or the luminance signal Y and the two "orthogonal signals" Q and I of the NTSC system. In each case, the number of independent pulses per second would be:

$$3 \times 7 \times 4.43.10^6 = 93.03$$

millions, which would necessitate a receiving preamplifier bandwidth of 93.03/2=46.5 mc./s.; this is again too high for the present ruby-masers.

But it is possible (as hereafter explained) to consider three parameters which (based on the experience gained in colour vision) do not necessitate a quantization accuracy so high as for those parameters mentioned above. It has been proved that the human eye is very sensitive to the sharpness of the drawing which corresponds to the luminance signal in television; it is rather sensitive to difference of hue, but rather insensitive to difference in saturation degree; in fact, an amplitude variation of 50% for the colour subcarrier in the NTSC system is not always clearly noticed.

The following quantization accuracies can therefore suffice:

30 luminance levels signal L, corresponding to a five digit binary codes, two levels remaining available;

30 colour-hue levels (signal C), corresponding to a five digit binary code, the two lower levels remaining available;

2 different values (0 or 1) for the degree of colour-saturation (signal S), so that, in the received picture, only a red or a pink, or only a violet or a mauve, etc. will be obtained.

It may be mentioned that saturation variations (within the same hue) give an illusion of brightness variations, and, conversely, brightness variations (within the same hue) give an illusion of saturation variations.

Under these conditions, eleven pulses only will be necessary for any point of the televised scene, i.e. for each period of the colour subcarrier.

The number of independent pulses per second will thus be reduced to $11 \times 4.43.10^6 = 48.73$ millions, corresponding to a band of 48.73/2=24.36 mc./s.; this is quite acceptable with the present ruby-masers.

Taking into account the power for the regeneration of the coded pulses on board of the satellite, and also the losses in circuits and cabling, it is obvious that all necessary power will be produced in the satellite by well-protected solar-cells associated with small storage batteries.

FIG. 9 represents the ground station in United States of America (EV in FIG. 1) transmitting, in pulse code modulation, towards the satellite the video signals VS produced in a colour-television pick-up studio, and FIG. 11 represents a ground station in Europe (RV' in FIG. 1) receiving the coded pulses, previously regenerated and retransmitted to Europe by means of satellite repeaters; this receiving station restores the video signals VS, and distributes them to the European stations for broadcasting the American program of colour television.

The system to be described comprises the transmission, at the end of each scanning line, of a timing pulse $\tau$ having a duration substantially greater than the duration of a coded pulse; for each point of the televised scene (i.e. for each period of the colour-subcarrier), there are at the utmost: five pulses (code cL) for luminance, five pulses (code cC) for the hue of the colour, and one pulse (S) for the colour saturation, but only in case of a very saturated colour. As thirty luminance levels suffice (zero level corresponding to black), and as five coded pulses can provide thirty-two levels, the maximum level (code $ci$ constituted by 5 successive "1") is allotted to field synchronization, and the level immediately below the maximum (code $cl$, constituted by one "0" and four "1") is allotted to line—synchronization.

As thirty hue levels suffice, and as a five digit binary code is also used for the colour hue, the two lowest levels, taken together, correspond to "no colour" (black, grey or white); this is very appropriate, because the human eye is much disturbed by a spurious appearance of colour due to "noise" where no colour is expected. Finally, at the end of a picture field the following sequence is transmitted: "timing signal $\tau$, code $ci$"; at the end of a scanning line the sequence: "timing signal $\tau$, code $cl$"; and, for each point of the televised scene the sequence: "code cL, code cC, pulse S."

In the NTSC colour television system, the phase shift $(\alpha - \beta)$ between the colour burst and the chrominance signal Chr, i.e. the modulated colour-subcarrier, corresponds to the colour hue C.

FIG. 9 shows the ground transmitting station EV of FIG. 1 receiving the video signal VS elaborated in a studio according to the NTSC system. This signal is observed on a monitoring colour television receiver 12, and, on the other hand, applied in parallel to a synchronization signal separator 14 delivering, on two outputs, the field synchronization signals $ti$ and the line synchronization pulses $tl$; to a peak clipper 16, delivering the part $L+Chr$ of the video signal; and to the signal input of a normally closed gate 13 which is unblocked as explained hereafter for delivering the colour burst signals $sr$.

The line synchronization pulses $tl$, obtained at the output of sync separator 14, are applied to a differentiating and rectifying circuit 15, which delivers signals $ftl$ constituted by the front part of these pulses.

Signals $ftl$, by means of a monostable multivibrator (not shown), controls gate 13 for unblocking the latter only during the time intervals corresponding to the back porch of pulses $tl$, so that gate 13 delivers the colour burst signals $sr$, which, as is well known, constitute a phase reference for the subcarrier.

An oscillator 20, oscillating at the subcarrier frequency $fc$, is synchronized in phase by means of a feedback loop comprising a phase detector 36, one input of which receives from gate 13 the colour burst signals $sr$.

Figure 8:
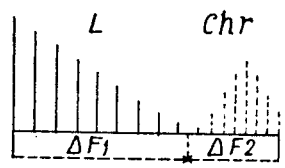
FIG. 8 is the frequency spectrum of a colour television signal.

Peak clipper 16 feeds in parallel two frequency filters 17 and 18 filtering respectively luminance signal L (band $\Delta F1$, FIG. 8, the highs of this signal being disregarded), and the modulated subcarrier or chrominance signal Chr (band $\Delta F2$, FIG. 8).

A phase detector 19, receiving on its two inputs respectively the chrominance signal Chr and the phase-synchronized sine wave at frequency $fc$ delivered by oscillator 20, delivers the hue signal C. An amplitude slicer 21 also fed by filter 18 delivers a saturation pulse S of well defined level, only in case of a very saturated colour.

A timing circuit 22, controlled by local oscillator 20, delivers at the end of each scanning line, by means of a pulse generator 11, a timing pulse $\tau$ of relatively long duration, and also controls the operation of the sampling—quantizing—encoding devices 23 and 24 which respectively transform the analog values of luminance signal L and of signal C, respectively obtained at the outputs of filter 17 and of phase detector 19, into the five digit codes $cL$ and $cC$.

Figure 10:
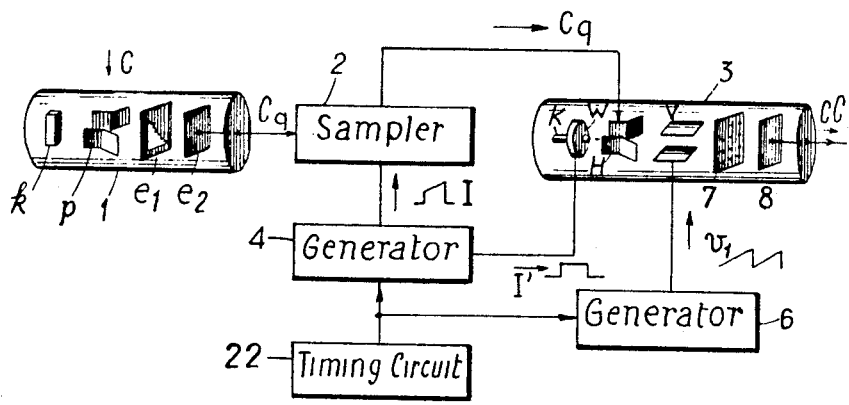
FIG. 10 is a detail of the circuit illustrated in FIGURE 9.

FIG. 10 shows one possible embodiment of quantizing—sampling and encoding device 24 of FIG. 9. A cathode ray tube 1, acting as a quantizer, has a vertical rectilinear cathode $k$, and horizontally deflecting plates $p$ positioning, under the control of hue signal $C$, the electronic image of cathode $k$ on a particular vertical of slotted electrode $e_1$, the slot of which has a lower horizontal edge and an upper edge in shape of a succession of thirty steps (like a staircase) corresponding to thirty different quantized hue signals $C_q$ thus obtained on a collecting electrode $e_2$. A conventional sample 2 is energized by the quantized hue signal $C_q$ also receiving sampling pulses I produced by a generator 4 synchronized by timing circuit 22 of FIG. 9. The successive samples of $C_q$ at the output of sampler 2 are applied to the horizontally deflecting plates H of an encoding cathode ray tube 3; plates H, under the control of voltage $C_q$, position the electronic image of cathode K of tube 3 at the bottom of a particular vertical of an apertured electrode 7; a saw-tooth wave $v1$, produced by a generator 6 synchronized by timing circuit 22, is applied to the vertically deflecting plates V of tube 3. When control pulse $I'$, also produced by generator 4, unblock the Wehnelt electrode W of tube 3, the electron pencil beam produced by cathode K sweeps from bottom to top said particular vertical line of electrode 7, and collecting electrode 8 of tube 3 collects successively the coded pulses $cC$ corresponding to the particular value $C$ of the hue signal applied to plates $p$ of tube 1.

Reverting to FIG. 9, pulse generators 25 and 26, also controlled by timing circuit 22, generate periodically the particular code $cl$ (01111) allotted to line-synchronization, and the particular code $ci$ (11111) allotted at field synchronization.

A gate 27 has its signal input connected to the output of generator 25, and its control input connected to the output of a monostable multivibrator 28.

Code $cl$ goes through gate 27 when a signal $ftl$ (front of a line synchronizing pulse) delivered by circuit 15 triggers monostable multivibrator 28 into its unstable sate for a predetermined duration following this signal $ftl$ and causes it to open gate 27 for this predetermined duartion.

Signals $fti$ corresponding to the front of the field synchronizing signals are, on the other hand, obtained by means of an integrator 29 connected to the second output of sync separator 14. Each signal $fti$ triggers a monostable multivibrator 30 into its unstable state; the signal of predetermined duration delivered by multivibrator 30 opens a gate 31, connected to the output of generator 26, to let through code $ci$.

Conventional electronic delay devices, 32 and 33, give to code $cC$ and to saturation pulse S appropriate time positions with respect to code $cL$, at the input of a mixer 34, so that there is obtained, at the input of radio transmitter 35, connected to the output of mixer 34:

at the end of a field, the sequence: "timing pulse $\tau$, code $ci$";

before the beginning of a scanning line, the sequence "timing pulse $\tau$, code $cl$";

and, for each point of the televised scene, the sequence "code $cL$, code $cC$, pulse S," comprising a maximum of eleven pulses.

The high frequency signals generated by transmitter 35 are radiated by means of aerial AE pointing towards the first satellite repeater.

The pulses so transmitted and relayed by means of the satellites are received by the terminal ground station, which will now be described referring to FIG. 11.

In FIG. 11, an aerial AR having at its focus a maser preamplifier MR, receives the high frequency pulses previously regenerated by the satellite repeaters.

Amplifier MR feeds a radio receiver 41 at the output of which a pulse duration-amplitude converter 42 is connected. Converter 42 may be, according to known art, constituted by a blocking oscillator followed by a limiting-integrating tube.

At the output of converter 42, the timing pulses $\tau$ which had a longer duration than the coded pulses, are now converted into pulses having a higher level than the coded pulses.

Converter 42 has its output connected to a peak clipper 65, acting as a low pass amplitude filter, and to base clipper 43, acting as a high pass amplitude filter, the former letting through all the pulses, brought back to the same level, and the latter delivering only short pulses $\tau'$ corresponding to the initial $\tau$ pulses.

The trains of coded pulses delivered at the output of peak clipper 65 are applied to a frequency restorer 66, supplying a continuous wave having the repetition frequency of the pulses. Frequency restorer 66 controls a timing circuit 67.

Two gates 48 and 46 are also connected to the output of peak clipper 65, the former being normally open and the latter normally closed.

Base clipper 43 is connected to a triode 44 which reverses the polarity of pulses $\tau'$. The output signals of triode 44 are applied to a monostable multivibrator 45, which delivers, for each pulse $\tau'$, a rectangular pulse $i$ having the duration T of a group of five coded pulses.

Each pulse $i$ unblocks gate 46 and, through a triode 47, delivering a polarity reversed pulse $i'$, blocks gate 48 for the duration T.

For the aforesaid duration T, the output signals of peak clipper 65 thus appear at the output of gate 46 and not at the output of gate 48.

The five coded pulses obtained at the output of gate 46 reach a delay line 49 terminated by an impedance 50 equal to its characteristic impedance; these coded pulses are successively stored in ferrite cores, $t_1$, $t_2$, $t_3$, $t_4$ and $t_5$, successively fed by suitably located outputs of delay line 49.

The short positive pulse $\tau'$, after a delay equal to T imposed by delay device 52, triggers a reading wire 53, going through the five ferrite cores, which then deliver the previously stored informations to the inputs of the two electronic gates 54 and 55, gate 54 having five inputs respectively connected to the five cores, and gate 55 only four inputs connected to the cores $t_2$ to $t_5$ storing the last four of the five digits. If, the code following the timing pulse $\tau$ is the code $ci$ (11111), gate 54 delivers a short pulse $iti$ which blocks gate 55 during the interval between two successive picture fields by means of an inhibition circuit, comprising a monostable multivibrator (not shown) and if the code following the timing pulse $\tau$ is the code $cl$ (01111), the corresponding level (analog voltage) is not sufficient for gate 54 to deliver an output signal, but allows gate 55, which is no longer inhibited, to deliver a short pulse $itl$.

When a pulse $iti$ is collected, it triggers a monostable multivibrator 56, which opens a gate 57 for the duration of the time interval separating two consecutive picture fields. A synchronization generator 58, itself controlled by timing circuit 67, delivers at a first output the field synchronizing signals $ti$ which reach, through gate 57, a first input of a mixer 59.

Similarly, each pulse $itl$ delivered by gate 55 triggers a monostable multivibrator 60, which opens a gate 61 for a short duration before the beginning of each picture line; the line synchronization pulses $tl$, delivered at a second output of generator 58, reach through gate 61 a first input of another mixer 62.

An oscillator 64, oscillating at the subcarrier frequency, and controlled by timing circuit 67, has its output connected to the signal input of a gate 63.

Pulses $itl$ obtained at the output of gate 55 are also used for unblocking this gate 63, on its control input, for a short duration corresponding to a few periods of the sine wave generated by oscillator 64. The colour burst signal *sr* thus obtained at the output of gate 63 is applied to the other input of mixer 62, which it reaches during the back-porch of synchronizing pulse *tl*. The output signal of mixer 62 is applied to a second input of mixer 59.

During an effective picture line, gate 48 connected to the output of peak clipper 65 remains open, and the sequence of eleven pulses (*cL*, *cC*, S) corresponding to the various points of the televised scene reach the control grids of tetrodes 68, 69 and 70, the screen grids of which are respectively controlled by periodical rectangular pulses *iL*, *iC* and *iS* delivered by a pulse generator 71 also synchronized by timing circuit 67.

FIG. 12 shows a sequence corresponding to a point of the televised scene and the corresponding signals *iL*, *iC* and *iS*.

Codes CL, *cC* and pulse S are thus respectively obtained at the outputs of tetrodes 68, 69 and 70.

Codes *cL* and *cC* are respectively applied to the corresponding decoders 72 and 73 (FIG. 11), while pulse S, in case of a very saturated colour, is applied to an amplitude-modulator 74; the operations of decoders 72 and 73 are fulfilled, under the control of timing circuit 67 by means of the connections shown in dotted lines, in synchronism with the encoding operations in the radio-transmitting station of FIG. 9.

Conventional electronic delay devices 75 and 76 respectively connected to the outputs of decoders 73 and 72, bring into time coincidence the luminance signal L, restored by decoder 73, the hue signal C restored by decoder 72, and the saturation signal S corresponding to the same element of the televised scene. A phase modulator 77 modulates the phase of the colour subcarrier generated by oscillator 64 in accordance with hue signal C; obtained at the output of delay device 75; the phase-modulated wave thus obtained is then amplitude modulated by amplitude modulator 74 in accordance with saturation signal S (in case of a very saturated colour).

The NTSC chrominance signal C*hr* is thus restored at the output of amplitude modulator 74 and applied to a further input of mixer 59, which finally receives on its last input the luminance signal L, coming from delay device 76. The video signal VS, comprising the luminance and chrominance signals, the field and line synchronizing signals and the colour bursts are thus obtained at the output of mixer 59.

This signal is applied to a receiver 78 and to high frequency transmitting circuits (not shown) for transmission to the various European broadcasting stations, desiring to broadcast the American colour television program.

FIGS. 13 and 14*a* and *b* represent a colour television transmission, by means of satellites, between two private colour television stations, through a radioelectric transmitting station and a radioelectric receiving station. Land long distance channels, for example coaxial pairs in cables, or wide-band channels of a radio relay link, connect these private colour television stations to these radioelectric stations; the colour television system assumed to be used in this case is based on the mapping of the colour triangle (FIG. 15). This triangle is divided into thirty different sectors corresponding to thirty different colours, i.e. fifteen different hues and two different degrees of colour saturation. For different reasons, in particular because the users of these stations are able, if necessary, to bring the objects to be shown near the pick-up cameras, the definition need not be so high as in the case of broadcasting; the video-signal occupying, for example, only 3 mc./s., and the colour subcarrier having a frequency of 2.5 mc./s.

In this colour television system, the colour subcarrier is only amplitude modulated by a voltage proportional to the number of the sector corresponding to the colour to be transmitted (hue and saturation). Assuming there-fore 10 coded pulses for each point of the televised scene (five for luminance, and five for colour), there will be $10 \times 2.5 \times 10^6 = 25$ millions of independent pulses per second; therefore a band of $25/2 = 12.5$ mc./s. must be allotted to each direction of transmission for this private colour television communication. Such "communications" are similar to the "long distance telephone subscription calls" (or to the "conference calls," in telephony) taking place periodically at given hours; in such "closed circuit colour television," the ground stations corresponding with the satellites are used during a short period, when the official services do not require them.

Thirty of thirty-two levels corresponding to a five digit binary code will be used for the colours (code *cC'*); the two lowest levels correspond to the hatched part of FIG. 15, i.e. "no colour" (block, grey or white), or a narrow coloured sector which for technical reasons is assimilated to "no colour."

Thirty of the thirty two levels of another five digit binary code are used for luminance (code *cL*); the two highest levels are allotted to the field synchronisation signal (code *ci*: 11111) and to the line synchronisation signal code *cl*: 01111). As, in the wave shape of the video-signal VS (FIG. 7), the chrominance signal C*hr* (modulated colour subcarrier) is superimposed on the luminance signal L, shown in dotted line, this video-signal (VS) can have $30 \times 2 = 60$ different amplitude levels; this woud be too much for broadcasting, considering the relatively small range of amplitude linearity in the existing powerful broadcasting radioelectric transmitters; but sixty amplitude levels can be discriminated on the modern long distance channels of the public telecommunication networks, namely on the coaxial pairs of modern cables, having a broad interval of amplitude linearity, and also very small "circuit noise."

In FIG. 13, a conventional colour camera 91 delivers the three primary colour signals R, G, B, that resistor-matrix 92 transforms into the corresponding X, Y and (X+Y+Z) signals of the International Illumination Committee. Y being precisely the luminance signal, otherwise called L herein. According to known art, an encoding cathode ray tube 93, the deflecting systems of which are fed by signals $$x = \frac{X}{X+Y+Z} \text{ and } y = \frac{Y}{X+Y+Z}$$

produces the colour coded signal C', i.e. a voltage proportional to the number of the sector corresponding to the colour to be transmitted, in the triangle of FIG. 15. Synchronization-generator 94 generates the field-synchronizing signals *ti* and the line synchronizing pulses *tl* which are applied to the colour camera 91. A sine-wave oscillator 95 generates the colour subcarrier, at frequency *fc*, which is an odd multiple of half the line scanning frequency, by means of which synchronization generator 94 is controlled. This sine wave is also modulated in accordance with coded colour signal C' by means of amplitude-modulator 96. At the output of modulator 96 is obtained the "chrominance signal C*hr*," i.e. band $\Delta F_2$ in FIG. 8.

A mixer 97 superimposes this signal on luminance signal L. The composite signal so obtained is applied to another mixer 98 together with the field-synchronizing signals *ti* and the line synchronizing pulses *tl*, delivered by generator 94. The video-signal VS, obtained at the output of mixer 98 is applied to the carrier-current transmitting system 99, at the origin of coaxial pair 100; the carrier-current receiving system 101 at the end of this coaxial pair applies this video-signal VS:

(1) To the monitoring colour television receiver 102 of the ground transmitting station, the aerial AE of which is aiming towards the satellite; to a peak clipper 111 delivering the luminance and chrominance signals, and to a synchronizing signal separating circuit 103 delivering respectively on its first and second outputs the field and line synchronizing signals $ti$ and $tl$. Signals $ti$ are applied to an integrating circuit 104 and signals $tl$ to a differentiating and rectifying circuit 105.

Integrator 104 and circuit 105 respectively separate the fronts $fti$ and $ftl$ of the field synchronizing signals $ti$ and of the line synchronizing pulses $tl$.

Signal generators 123 and 124 synchronized by a timing circuit 117, itself controlled as will be shown hereinafter, respectively generate periodically codes $ci$ (11111) and $cl$ (01111).

Gates 107 and 110 are respectively connected to the outputs of generators 123 and 124, and respectively unblocked during the proper time intervals by monostable multivibrators 106 and 109, which are respectively triggered into their unstable states by pulses $fti$ and $ftl$ delivered by integrator 104 and differentiator 105. Codes $ci$ and $cl$ are thus respectively obtained at the outputs of gates 107 and 110 and applied to two inputs of a mixer 108.

Peak clipper 111 is followed by two frequency filters 112 and 113 in parallel; filter 112 filters band $\Delta F_1$ (FIG. 8$b$) of luminance signal L; filter 113 filters band $\Delta F_2$ of chrominance signal C$hr$, which is applied to an amplitude demodulator 114. The colour coded signal C' is thus obtained at the output of demodulator 114. Signal C$hr$ is also applied to a narrow-band filter 115, which filters a sine-wave at the frequency $fc$ of the colour subcarrier; this wave, through amplitude-limiter 116, controls the timing circuit 117.

The sampling-quantizing and encoding devices 118 and 119 transform the luminance signal L and the coded colour signal C' into groups of five coded pulses: code $cL$ and code $cC'$. An electronic delay device 120 connected to the output of circuit 119, delays code $cC'$ to make it follow immediately code $cL$ at the inputs of mixer 108. The encoding operations are fulfilled under the control of timing circuit 117. This circuit also controls a pulse generator 121, delivering at the end of each scanning line, a timing pulse $\tau$ having a duration substantially greater than that of the coded pulses.

Consequently, at the output of mixer 108, there is obtained:

Before the beginning of a picture field, the sequence "timing pulse $\tau$, code $ci$ (11111)";

Before each scanning line, the sequence "timing pulse $\tau$, code $cl$ (01111)";

For each point of the televised scene, a sequence of ten pulses: "code $cL$, code $cC'$." These groups of pulses modulate the carrier wave in the radioelectric transmitter 122 feeding the horn CE located at the focus of aerial AE which aims towards the satellite.

FIG. 14$a$ represents the ground radioelectric station receiving from the satellite the regenerated pulses.

It will be readily appreciated that the signals received are the same as those received in the case of FIG. 11 with this difference that a colour code signal $cC'$ including the saturation information is substituted for the code $cC$ and pulse S is in the preceding system.

Therefore the operation of the receiving station of FIG. 14$a$ is exactly the same as concerns the first stages of the receiving station, the restoration of a continuous wave, having the repetition frequency of the pulses of the coded trains, for controlling a timing circuit, and the generation of the field and line synchronizing signals $ti$ and $tl$.

Elements AR, MR, 41, 42, 65, 43, 66, 52, 44, 45, 46, 47, 48, 49, 50, $t1$ to $t5$, 53, 54, 55, 56, 57, 60, 61 and 58 have the same signification and operate in the same manner as in the case of FIG. 11.

Thus there is obtained:

At the input of frequency restorer 66 a wave signal controlling a timing circuit 150.

At the output of gate 48 the coded sequences $cL$ and $cC'$ corresponding to each point of the televised scene.

And at the outputs of gates 57 and 61 the field and line synchronizing signals $ti$ and $tl$.

Timing circuit 150 controls an oscillator 151, delivering a wave at the subcarrier frequency $fc$.

Timing circuit 67 also controls a signal generator 145 generating the square signals $iL$ and $iC'$ coinciding in time respectively with codes $cL$ and $cC'$ as shown in the left portion of the figure.

The output signals of gate 48 are applied to the control grids of tetrodes 143 and 144, respectively unblocked, on their screen grids, by signals $iL$ and $iC'$ delivered by signal generator 145.

Decoders 146 and 147, respectively fed by tetrodes 143 and 144, respectively restore the luminance signal L and the colour signal C'.

The decoding operations are synchronized by timing circuit 150 by means of connections shown in dotted lines.

A delay device 148 connected to the output of decoder 146 delays signal L with respect to signal C' to bring into time coincidence the information relative to the same points of the televised scene.

An amplitude-modulator 152 modulates the amplitude of the subcarrier wave delivered oscillator 151 in accordance with the coded colour signal C' delivered by decoder 147, and the chrominance signal C$hr$ so restored is superimposed on the luminance signal L in mixer 142 which also receives the synchronizing signals $ti$ and $tl$ delivered by gates 57 and 61.

The video signal VS so obtained is applied to the carrier-current sending system 153 feeding coaxial pair 154. The receiving system 155 fed by coaxial pair 154, and the further circuits are shown in FIG. 14$b$.

At the output of the receiving system 155, a separating circuit 156 separates the synchronization signals $ti$ and $tl$, for synchronizing the saw-tooth oscillators 158 and 157 feeding the vertical and horizontal deflection systems 160 and 159 which scan the trichrome fluorescent screen 161 of a viewing tube 162 having three electrons 164, 165 and 166 operating respectively with the blue, green and red signals.

The luminance signal L and the chrominance signal C$hr$ obtained at the output of receiving system 155 are separated respectively by filter 167 (passing band $\Delta F_1$) and filter 168 (passing band $\Delta F_2$). An amplitude demodulator 169 connected to the output of filter 168 derives from C$hr$ the coded colour signal C' i.e. a voltage proportional to the number of the sector of the colour triangle (FIG. 15) corresponding to the colour to be reproduced.

A decoding cathode ray tube 170 has a vertical rectilinear cathode 171, the electronic image of which is positioned on a particular vertical line of decoding electrode 172 by horizontally-deflecting-plates 173, under the control of coded colour signal C' corresponding to the input signal. A front view of electrode 172 is shown in FIG. 16. It comprises four horizontal rows of apertures $s$, $r$, $g$ and $b$ so designed that the heights of the apertures along a vertical line correspond respectively to the saturation S and to the components (blue $b_2$, green $g_2$ and red $r_2$) of the hue of the colour corresponding to this line, in accordance with the colour diagram of FIG. 15, on which points B, G, R represent the primary colours (blue, green, red) chosen for the colour camera 91 (FIG. 13) and for the trichrome fluorescent screen 161. Therefore, the signals $b_2$, $g_2$, $r_2$ obtained on the collecting electrodes $cb$, $cg$, $cr$ located behind slots $b$, $g$, $r$ in tube 170 are proportional to the components of the desired colour-hue; moreover if the colour is very saturated, there is obtained, on collecting electrode $cs$ located behind slot $s$ in tube 170 a pulse S which is used to increase simultaneously the gain of amplifiers 174, 175 and 176, at the inputs of which are respectively applied signals $b_2$, $g_2$ and $r_2$.

Luminance signal L is used to obtain three primary signals $b_1$, $g_1$ and $r_1$ corresponding to this luminance L. To this end luminance signal L, obtained at the output of filter 167, is fed, through an amplifier 177, to a matrix constituted by resistors R$r$, R$g$, R$b$, R'', and three identical resistors R', whose values are such that:

$$Rr + R' = \frac{1}{3} \frac{R''}{0.30}$$

$$Rg + R' = \frac{1}{3} \frac{R''}{0.59}$$

$$Rb + R' = \frac{1}{3} \frac{R''}{0.11}$$

the proportions of the three primary colours in white light being precisely: 0.30 for red, 0.59 for green, and 0.11 for blue. The voltages $b_1$, $g_1$, $r_1$ thus obtained at the output terminals of this matrix are applied to amplifiers 185, 186 and 187 respectively.

Collecting electrode $cs$ is connected, through a polarity reversing triode 178, to these amplifiers so that their gains are simultaneously reduced when a pulse S is collected. Through adding respectively signals $b_1$ and $b_2$, signals $g_1$ and $g_2$ and signals $r_1$ and $r_2$ in mixers 181, 180 and 179 three signals B, G and R are obtained which reproduce the primary signals B, G and R existing at the same instant at the terminals of the pick-up camera in the private colour television transmitting station (FIG. 13); these signals B, G and R, coming out of mixers 181, 180 and 179 control, through appropriate "gamma correctors" 182, 183 and 184 the three electron guns 164, 165 and 166 of viewing tube 162, on the fluorescent screen 161 of which the coloured picture of the televized scene is thus reproduced.

Various modifications can be made in the device described hereinabove, without departing from the scope of the invention. Moreover, the colour television transmission system which has been described is not restricted for use in the relay system of the type described, such a colour television transmission system being new and useful per se.

If enough power is obtainable on board of the active satellites, and if the future preamplifier maser pass a frequency band larger than 25 mc./s., it will be possible to improve the quality of the colour television transmission by increasing the numbers of digits in each coded signal L luminance, C hue and S saturation corresponding to the NTSC system.

Thus, 6 digits for the code $c$L, six digits for the code $c$C, and two digits for the code $c$S corresponding to saturation will permit a richer colour grading, as well as better half tone in brightness reproduction, together with a better signal to noise ratio for each point of the televized scene, a sequence of 6+6+2=14 pulses (maximum) would then be required; the corresponding bandwidth occupied in the radioelectric spectrum would then amount to:

$$14 \times 4.43 \times 10^6 / 2 \text{ c./s.} = 31 \text{ mc./s.}$$

It has been assumed heretofore that the timing pulses $\tau$ were transmitted at the line scanning frequency.

It is also possible to transmit them at a higher repetition frequency if substantial noise, capable of interfering seriously with synchronization is present, i.e. to transmit a signal $\tau$ not only before the beginning of each scanning line, but also at regular intervals in the course of each scanning line, before some, or all, of the sequences of coded pulses relating to the successive picture points.

FIG. 17 shows how the pulses $iti$ and $itl$ used in the circuits delivering the synchronization signals $ti$ and $tl$ may then be obtained in the receiving circuits of FIG. 11 or FIG. 14$a$.

The changes to be effected being the same for both receiving stations, they will only be described with reference to the first system, using the receiving station shown in FIG. 14$a$.

In FIG. 17, a separating circuit 201 delivers on a first output only the timing pulses $\tau$, the coded pulses M$es$ appearing only on a second output. The sequence M$es$ of coded pulses may be either a longer message "code $c$L, code $c$C, pulse S," corresponding to a point of the televised scene, or a shorter message, i.e. code $ci$ or code $cl$, occupying, relative to the preceding pulse $\tau$ the same position as code $c$L when a longer message is preceded by a such a timing pulse.

A blocking oscillator 202, connected to the first output of separator 201, generates N cycles of a sine wave when it is triggered by pulse $\tau$. The frequency of oscillator 202 and number N are chosen so that the duration of N cycles is equal to the duration T of the group of twelve pulses constituted by $\tau$ and a longer message (FIG. 18).

A bistable multivibrator 205 has one input also connected to the first output of separator 201, and is triggered into one of its states by pulse $\tau$.

A differentiating and rectifying device 203 fed by oscillator 202 delivers a short positive pulse $i$ for each cycle of the sine wave generated by oscillator 202. Pulses $i$ are applied to a pulse counter 204 having two output terminals N1 and N2.

Terminal N1 delivers an output pulse when counter 204 has counted $5N/12$ pulses, and terminal N2 is associated with a return to zero device, schematically shown by a dotted line, and operating when the counter has counted N pulses.

Terminal N1 is connected to the second input of multivibrator 205 which is thus triggered into its other state when the counter has counted $5N/12$ pulses.

Consequently, multivibrator 206 produces, for each period T, a rectangular wave I, shown in FIG. 18, which has the duration $5T/12$ corresponding to the passage of codes $ci$ and $cl$ at the second output of separator 201.

Pulses I unblock a gate 206, which is connected to the second output of separator 201, and passes then code $cl$ or code $ci$, and also undesired codes $c$L. The output of gate 206 is connected to an artificial delay line 207 terminated by an impedance 208 equal to its characteristic impedance; five ferrite cores $t_1$, $t_2$, $t_3$, $t_4$ and $t_5$ acting as magnetic memories, are fed through five successive terminals of line 207, to store the five digits of these codes.

A reading wire 211 passes through the five cores, and the reading operations are brought about by the signals appearing on output N1 of counter 204.

The five cores are connected to five inputs of a gate 209, and the four cores $t_2$ to $t_5$ to four inputs of a gate 210, which operate in the same manner as gates 54 and 55 of FIG. 11, with this only difference that the operation described also eliminates the undesired codes $c$L, which do not afford a sufficient excitation either for gate 209 or for gate 210.

FIG. 19 illustrates a preferred embodiment of the phase detector 19, used in the transmitting station of FIG. 9, for deriving the hue signal, from the modulated colour subcarrier in the first colour television system.

Wave $E_1$, generated by oscillator 20 already shown in FIG. 9, has the frequency $fc$ of the colour subcarrier and the phase $\beta$ of the "colour burst $(sr)$." Filter 18, already shown in FIG. 9, is the frequency filter extracting from the video-signal the chrominance signal $E_2$, having the frequency $fc$, and a phase $\alpha$ characterizing the hue of the colour being given by $(\alpha - \beta)$.

Two wave shapers 223 and 224 constituted by limiting amplifiers, are respectively connected to the outputs of oscillator 20 and of filter 18, and convert waves E1 and E2 into substantially rectangular waves having the same frequency $fc$, respectively the same phases as E1 and E2, and a common amplitude $e$.

Two bistable multivibrators, 225 and 226, fed by wave shapers 223 and 224, generate, at their output terminals, rectangular signals having respectively the phases $\beta$ and $\alpha$, frequency $fc/2$, and a common amplitude $e'$. The latter signals are shown in FIG. 19. They are applied to limiters 227 and 228 having their outputs coupled at point $a$. The wave E (FIG. 20) obtained at said point $a$ has a portion of amplitude $(2v)$, the duration $\Delta t$ of which is a linear function of the phase difference $(\alpha - \beta)$. The blocking amplifier 229 cuts this portion of wave E at the level $p_1$ corresponding to its grid bias, and thus delivers a signal E' constituted by rectangular pulses modulated in duration.

A duration-amplitude-converter, comprising a limiting-integrating triode 230, is connected to the output of blocking amplifier 229, and feeds an amplifier 231, the output of which is coupled to an amplitude-demodulator 232. To the amplitude modulated pulses, supplied by duration-amplitude-converter 230 corresponds thus at the output of demodulator 232 a wave which is precisely the desired hue signal C.

FIG. 21 illustrates a modification of the circuit used in FIG. 11 for deriving the chrominance signal Chr from this hue signal C and from the saturation signal S; this device may be substituted for the phase modulator 77 and the amplitude modulator 74 shown in FIG. 11.

The chrominance signal Chr may be written as follows, S being a positive voltage proportional to the degree of colour saturation, $\theta_c$ being an angle characterizing the hue of the colour and corresponding to the phase difference between the unmodulated and the phase modulated colour subcarrier:

$$Chr = S \cos(\omega_c t + \theta_c)$$

$\omega_c$ being $2\pi$ times the colour subcarrier frequency $fc$. This may be written as follows:

$$Chr = S \cos \theta_c . \cos \omega_c t - S \sin \theta_c . \sin \omega_c t$$

The hue signal C is in fact the quantity $\theta_c$ after quantization, where as S is the saturation signal; therefore:

$$Chr = S(\cos C . \cos \omega_c t - \sin C . \sin \omega_c t)$$

In FIG. 21, oscillator 64 is the local oscillator already shown in FIG. 11, restoring the colour subcarrier of frequency $fc$, and from which are derived the colour bursts transmitted to the users. A cathode ray tube 251 has a vertical rectilinear cathode, K, a wehnelt electrode W, and a pair of horizontally deflecting plates P.

Inside this tube, an electrode Ec has two horizontal slots s and c, the form of which is shown in enlarged view, in FIG. 22. Each slot has a horizontal lower edge, and an upper edge reproduction for function $y = \delta + \delta \sin C$ for slot s and the function $y = \delta + \delta \cos C$, for slot c, where $\delta$ is a constant.

Saturation signal S being applied to the wehnelt electrode W, and hue signal C being applied to plates P, the electronic image of cathode K is formed on a particular vertical of electrode Ec corresponding precisely to the hue defined by C; on collecting plates ($P_1$, $P_2$), located respectively behind slot s and slot c are obtained electric voltages: $S(\delta + \delta \sin C)$ and $S(\delta + \delta \cos C)$, respectively; these voltages are applied to electronic adders 252 and 253 which simultaneously receive the electric voltage ($-\delta S$) produced by amplifier 254 controlled by saturation signal S.

At the output of these adders, there are obtained voltages equal to ($\delta S$ sin and $C$) and to ($\delta S$ cos $C$) which are respectively applied to the first control grids of heptodes 255 and 256, acting as multiplying circuits which receive on second control grids through capacitors 260 and 261 from oscillator 64: voltage $\delta \sin \omega_c t$ which is directly applied to heptode 41, voltage ($\delta \cos \omega_c t$) derived from oscillator 64 by means of a 90° phase shifter 259. The output voltage ($-\delta S \sin C . \sin \omega_c t$) of 255 and the output voltage of 256, after inversion by means of triode 257 ($+\delta S \cos C \cos \omega_c t$), are applied to an electronic adder 258, at the output of which is produced the desired chrominance signal Chr.

A system will now be described for the transmission by means of the satellites of the sound signals accompanying the picture signals. It should be noted that in the case of television, what is important is that the sound be received simultaneously with the picture with which it is associated, and not that the sound be transmitted sufficiently rapidly, as is the case for telephony.

As was explained before, codes ci and cl, corresponding to television synchronizing signals, are preceded by a timing or clock pulse $\tau$ generated by pulse generator 11 (FIG. 9) or 121 (FIG. 13), and having a duration substantially greater than all the coded pulses. The system used for the transmission of sound being identical for the first and second colour television transmission systems, the operation will only be described with reference to the first one.

FIGS. 23 and 25 represent two embodiments of the circuits used at the ground transmitting station (FIG. 9) and FIGS. 26 and 27 the circuit used at the ground receiving station (FIG. 11) for transmitting and receiving the sound signals SS, in the course of the time intervals allotted to the line synchronizating pulses $tl$.

These devices are based on modulating the duration of the timing pulse $\tau$, transmitted at the scannnig line frequency, by sound signal SS. Any type of pulse duration modulator may be used at the ground transmitting station of FIG. 9 for this purpose. As an example only, FIG. 23 represents one known method of pulse duration modulation, the principle of which is illustrated by the graphs in FIG. 24.

The pulse generator, or clock 11, synchronizes a relaxation oscillator 281 generating a sawtooth wave $ds$; this wave $ds$ is applied together with the sound signal SS to the addder 282, the output of which (upper portion of FIG. 24) is coupled to a base clipper 283; at the output of clipper 283 is obtained the sound modulated signal $\tau S$ (lower portion of FIG. 24).

This pulse is applied to a gate 284, which is closed, except during the time intervals allotted to the line synchronizing pulses ($t$ in FIG. 7).

The short pulses $ftl$ obtained at the output of the differentiating and rectifying circuit 15 (FIG. 9), and corresponding to the front of the line synchronizing signals are directly applied to one input of a bistable multivibrator 287 and, through a delay line 288, adjusted to impart a delay equal to the duration of the line synchronizing pulses, to its other input.

For each pulse $ftl$ a rectangular pulse I1, having the aforesaid duration, is obtained.

This pulse I1 is applied as a gating signal to gate 284 for unblocking the same for the passage of signal $\tau S$ at the beginning of each scanning line.

Instead of the arrangement 281-282-283 of FIG. 23, another type of duration-modulator can be used, as illustrated in FIG. 25. A conventional pulse amplitude-modulator 290, for example of the pentode type, fed with the timing pulses $\tau$ and the sound signals SS, by means of connections not shown, delivers on its plate outpu $\gamma 1$ connected to the high voltage source through a resistor 293, a pulse $\tau$ which is amplitude modulated in accordance with signal SS. The amplitude modulated pulses are applied through a capacitor 292 to the control grid of a pentode 291 which is also connected, through resistance 294, to the high voltage source also used for energizing the plate of pentode 291 through a resistor 295. When an amplitude modulated pulse is applied to the control grid of pentode 291, it blocks the latter, so that capacitor 292 begins to charge towards the plate battery voltage with a time constant equal to $C_{292}(R_{293}+R_{294})$, where $C_{292}$ is the capacity of capacitor 293, and $R_{293}$ and $R_{294}$ the respective values of resistors 293 and 294.

But when the voltage appearing at point $\gamma 2$ connected to the control grid of pentode 291 reaches the value zero, the voltage is stabilized; therefore at point $\gamma 3$ (plate of pentode 291), the desired signal $\tau S$, i.e. timing pulse $\tau$ duration modulated by the sound SS, is obtained.

FIG. 26 shows the changes to be made in the receiving station of FIG. 11, following elements AR, MR, 41 and 42 which remain unaltered. Before each picture line are obtained at the output of the duration-amplitude-converter 42, the timing signal $\tau S'$, now amplitude modulated by the sound signal SS, followed by code cl (or code $ci$); on this signal $\tau S'$, four levels can be discriminated: the distance between levels 0 and 1 corresponds to the coded pulses ($cl$ or $ci$) characterizing the television synchronization; level 2 corresponds to the minimum amplitude of the sound signals (SS), whereas level 3 corresponds to the peaks of the sound.

The duration-amplitude-converter 42 feeds a base clipper 300 so biased that only the portion $\tau''$ of $\tau S'$ between levels 2 and 3 can pass through it; the desired sound SS is therefore separated by clipper 300, followed by a demodulator 303 for amplitude-modulated-pulses, which can be either a conventional diode arrangement or, as shown in FIG. 27, a pentode 310, on the screen grid of which the amplitude modulated pulses $\tau''$ are applied, whereas unblocking pulses $id$ generated by a pulse generator 309, synchronized by the timing circuit 67 (FIG. 11) of the receiving station are applied to control grid. At the output of this amplitude demodulator the sound signal SS is thus restored.

Reverting to FIG. 26, the duration amplitude converter 42 also feeds a slicer 301 separating from $\tau S'$ the part $\tau'$ comprised between levels 1 and 2; these short positive pulses $\tau'$ occur at the beginning of each scanning line and controls a monostable multivibrator not shown on the drawing, the output signal of which unblocks a gate 304, and blocks a gate 305, the signal inputs of which are connected as indicated hereafter.

The duration amplitude converter 42 feeds, in addition to base clipper 300, and slicer 301 a peak clipper 302 so biased that only the portions of $\tau S'$ comprised between levels 0 and 1 can pass through it. This portion corresponds ot the level of the coded pulses $ci$ before each picture field, $cl$ before each picture line, or $cL$, $cC$ and S during each scanning line. Therefore codes $ci$ and $cl$ go through gate 304, connected to the output of peak clipper 302 whereas $cL$, $cC$ and $cS$ go through gate 305 during each scanning line, and coded pulses $ci$, $cl$, $cL$, $cC$ and S being otherwise used as explained with reference to FIG. 11 to restore the synchronizing and picture signals.

While the invention has been illustrated and described as hereinabove, it is not intended to be limited to the details shown, since various modifications and structural changes may be made without departing in any way from the scope of the present invention.

What is claimed is:

1. A colour television transmitting ground station comprising: means for deriving a luminance signal and $n$ colour signals, where $n$ is a positive integer smaller than three, relative to a scene to be televised; a timing circuit; sampling, quantizing and encoding means, controlled by said timing circuit, for deriving from said signals a first series of pulse coded signals carrying luminance information and $n$ other series of pulse coded signals respectively carrying $n$ colour informations; means for time positioning said pulse coded signals to derive therefrom successive sequences, each sequence comprising a pulse coded signal of the first series, and a pulse coded signal of each of said $n$ other series; means, controlled by said timing circuit, for generating at the end of each scanning line and at the end of each scanning field a timing pulse; means for generating, after each timing pulse following a scanning line, a pulse coded line synchronization signal, and after each timing pulse following a scanning field, a pulse coded field synchronization signal; means for duration modulating said timing pulses in accordance with the sound accompanying said televized scene, the modulated timing pulses having a longer duration than the pulses of said pulse coded signals; mixing means fed with said duration modulated pulses and with said pulse coded signals for delivering a complex signal; means for modulating said complex signal on a carrier wave to obtain pulses of high frequency oscillations, and means for radiating said last mentioned pulses towards an artificial satellite.

2. A colour television transmitting ground station comprising means for receiving a complex colour television video signal and a sound signal associated therewith, said complex video signal comprising line and field synchronization signals, a luminance signal, a wave which is phase modulated in accordance with hue and amplitude modulated in accordance with saturation and a reference signal indicative of a phase reference for said wave; means for separating said line synchronization signals, said field synchronization signals, said modulated wave, said luminance signal and said reference signal; an oscillator for delivering a sine wave at the frequency of said reference signal; means for synchronizing said oscillator by means of said reference signal; a timing circuit controlled by means of said sine wave; means for deriving from said line synchronizing signals first short pulses coinciding with the front of said line synchronizing signals; means for deriving from said field synchronizing signals second short pulses coinciding with the front of said field synchronizing signals; means controlled by said timing circuit and by means of said first short pulses for delivering pulse coded line synchronization signals; means controlled by said timing circuit and by means of said second short pulses for delivering pulse coded field synchronization signals; first sampling, quantizing and encoding means controlled by said timing circuit for deriving from said luminance signal pulse coded luminance signals; phase detecting means fed with said modulated wave and said sine wave for deriving said hue signal; second sampling, quantizing and encoding means controlled by said timing circuit for deriving from said hue signal pulse coded hue signals; means for deriving from said modulated wave a pulse coded saturation signal having a lower definition than said hue signal; means for time positioning said pulse coded luminance, hue and saturation signals to derive successive sequences each comprising one of each of said signals; a pulse generator controlled by said timing circuit for generating at the end of each scanning line and at the end of each scanning field a timing pulse; means for duration modulating said timing pulses in accordance with said sound signal, the modulated timing pulses having a longer duration than the pulses of said pulse coded signals; mixing means for deriving a complex signal comprising said duration modulated pulses and said pulse coded signals; means for amplitude modulating said complex signal on a carrier wave to derive pulses of high frequency oscillations; and means for radiating said pulses of high frequency oscillations towards a satellite.

3. A colour television transmitting ground station as claimed in claim 2, wherein said pulse coded saturation signal comprises a single pulse when the amplitude of said modulated wave is above a definite level, and no pulse when said amplitude is equal to or below said level.

4. A colour television transmitting ground station comprising: means for receiving a complex colour television video signal, and a sound signal associated therewith, said complex video signal comprising line and field synchronization signals, a luminance signal, a wave which is amplitude modulated in accordance with a single colour signal indicative of a sector of the colour triangle, means for separating said line synchronization signals, said field synchronization signals, said modulated wave, and said luminance signal; means for limiting the amplitude of said modulated wave; a timing circuit controlled by means of said amplitude limited wave; means for deriving from said line synchronizing pulses first short pulses coinciding with the front of said line synchronizing pulses; means for deriving from said field synchronizing pulses second short pulses coinciding with the front of said field synchronizing signals; means controlled by said timing circuit and by means of said first short pulses for delivering pulse coded line sychronization signals; means controlled by said timing circuit and by means of said second short pulses for delivering pulse coded field synchronization signals; first sampling, quantizing and encoding means, controlled by said timing circuit, for deriving from said luminance signal pulse coded luminance signals; means for demodulating said amplitude modulated wave to obtain said colour signal; second sampling, quantizing and encoding means controlled by said timing circuit for deriving from said colour signal a pulse coded colour signal; means for delaying said pulse coded colour signal relatively to said pulse coded luminance signal to derive successive sequences, each comprising a pulse coded luminance signal and a pulse coded colour signal; a pulse generator controlled by said timing circuit for generating at the end of each scanning line and at the end of each scanning field a timing pulse; means for duration modulating said timing pulses in accordance with said sound signal, the modulated timing pulses having a longer duration than the pulses of said pulse coded signals; mixing means for deriving a complex signal comprising said duration modulated pulses and said pulse coded signals; means for amplitude modulating said complex signal on a carrier wave to derive pulses of high frequency oscillations; and means for radiating said pulses of high frequency oscillations toward a satellite.

5. A colour television receiving ground station comprising: means for receiving from a satellite and detecting colour television pulse signals constituted by a carrier wave amplitude modulated by pulses comprising at the end of each scanning line a duration modulated timing pulse followed by a pulse coded line synchronization signal, at the end of each field a duration modulated timing pulse followed by a pulse coded field synchronization signal, and, in the course of the scanning lines, successive sequences each comprising a pulse coded luminance signal and $n$ pulse coded colour signals, where $n$ is a positive integer smaller than three; the pulse constituting said pulse coded signals being shorter than the minimum duration of said duration modulated timing pulses; a duration amplitude converter having an input coupled to said receiving and detecting means and an output; a peak clipper, a slicer and a base clipper coupled in parallel to the output of said duration-amplitude-converter; first and second gating means coupled to said peak clipper, said first gating means being normally unblocked and said second gating means being normally blocked; means controlled by the output signals of said slicer for blocking said first gating means and unblocking said second gating means, said first gating means delivering said sequences and said second gating means said pulse coded line and field synchronization signals; a frequency restorer coupled to said peak clipper; a timing circuit controlled by said frequency restorer; decoding means, fed with said sequences and controlled by said timing circuit, and delaying means for restoring simultaneous decoded luminance and colour signals; an oscillator generating a sine wave, said oscillator being synchronized by said timing circuit; means for modulating said wave in accordance with each of said $n$ colour signals; means for deriving from said pulse coded line and field synchronization signals first and second single pulse auxiliary signals; means controlled by said timing circuit and by means of said first and second auxiliary signals for generating non coded field and line synchronization signals; mixing means for deriving a complex video signal comprising said decoded luminance signal, said modulated wave and said non coded field and line synchronization signals; means for transmitting said complex signal wave; means for demodulating the output pulses of said base clipper to derive a continuous sound signal; and means for transmitting said sound signal.

6. A colour television receiving ground station comprising: means for receiving from a satellite and detecting colour television pulse signals constituted by a carrier wave amplitude modulated by pulses comprising at the end of each scanning line a duration modulated timing pulse followed by a pulse coded line synchronization signal, at the end of each field a duration modulated timing pulse followed by a pulse coded field synchronization signal, and, in the course of the scanning lines, successive sequences each comprising a pulse coded luminance signal, a pulse coded hue signal and a pulse coded saturation signal; the pulses constituting said pulse coded signals being shorter than the minimum duration of said duration modulated timing pulses; a duration amplitude converter having an input coupled to said receiving and detecting means and an output; a peak clipper, a slicer and a base clipper coupled in parallel to the output of said duration-amplitude-converter; first and second gating means coupled to said peak clipper, said first gating means being normally unblocked and said second gating means being normally blocked; means controlled by the output signals of said slicer for blocking said first gating means and unblocking said second gating means, said first gating means delivering said sequences and said second gating means said pulse coded line and field synchronization signals; a frequency restorer coupled to said peak clipper; a timing circuit controlled by said frequency restorer; decoding means, fed with said sequences and controlled by said timing circuit, and delaying means for restoring simultaneous decoded luminance, hue and saturation signals; an oscillator generating a sine wave, said oscillator being synchronized by said timing circuit; means for phase modulating said wave by said decoded hue signal and amplitude modulating it by said decoded saturation signal; means for deriving respectively from said pulse coded line and field synchronization signals first and second single pulse auxiliary signals; means controlled by said timing circuit and respectively by means of said first and second auxiliary signals for generating non coded field and line synchronization signals; gating means controlled by said first auxiliary signals to derive from said oscillator a phase reference signal; mixing means for deriving a complex video signal comprising said decoded luminance signal, said phase and amplitude modulated wave, said phase reference signal and said non coded field and line synchronization signals; means for transmitting said complex signal on a carrier wave; means for demodulating the output pulses of said base clipper to derive a continuous sound signal, and means for transmitting said sound signal on a carrier wave.

7. A colour television receiving ground station comprising: means for receiving from a satellite and detecting colour television pulse signals constituted by a carrier wave amplitude modulated by pulses comprising at the end of each scanning line a duration modulated timing pulse followed by a pulse coded line synchronization signal, at the end of each field a duration modulated timing pulse followed by a pulse coded field synchronization signal, and, in the course of the scanning lines successive sequences each comprising a pulse coded luminance signal and a pulse coded colour signal indicative of a sector of the colour triangle; the pulses constituting said pulse coded signals being shorter than the minimum duration of said duration modulated timing pulses; a duration amplitude converter having an input coupled to said receiving and detecting means and an output; a peak clipper, a slicer and a base clipper coupled in parallel to said output of said duration-amplitude-converter; first and second gating means coupled to said peak clipper, said first gating means being normally unblocked and said second gating means being normally blocked; means controlled by the output signals of said slicer for blocking said first gating means and unblocking said second gating means, said first gating means delivering said sequences and said second gating means said pulse coded line and field synchronization signals; a frequency restorer coupled to said peak clipper; a timing circuit controlled by said frequency restorer; decoding means, fed with said sequences and controlled by said timing circuit, and delaying means for restoring simultaneous decoded luminance and colour signals; an oscillator generating a sine wave, said oscillator being synchronized by said timing circuit; means for amplitude modulating said wave by said decoded colour signal; means for deriving from said pulse coded line and field synchronization signals first and second single pulse auxiliary signals; means controlled by said timing circuit and by means of said first and second auxiliary signals for generating non coded field and line synchronization signals; mixing means for deriving a complex video signal comprising said decoded luminance signal, said amplitude modulated wave and said non coded field and line synchronization signals; means for transmitting said complex video signal; means for demodulating the output pulses of said base clipper to derive a sound signal, and means for transmitting said sound signal.

8. A colour television transmitting ground station comprising: means for deriving a luminance signal and $n$ colour signals, where $n$ is a positive integer smaller than three, relative to a scene to be televized; a timing circuit; sampling, quantizing and encoding means, controlled by said timing circuit, for deriving from said signals a first series of pulse coded signals carrying luminance information and $n$ other series of pulse coded signals respectively carrying $n$ colour informations; means for time positioning said pulse coded signals to derive therefrom successive sequences, each sequence comprising a pulse coded signal of the first series and a pulse coded signal of each of said $n$ other series; means, controlled by said timing circuit, for generating a timing pulse at the end of each scanning line and at the end of each scanning field; means for generating, after each timing pulse following a scanning line, a pulse coded line synchronization signal, and, after each timing pulse following a scanning field, a pulse coded field synchronization signal; mixing means fed with said timing pulses and with said pulse coded signals for delivering a complex signal; means for modulating said complex signal on a carrier wave to obtain pulses of high frequency oscillations, and means for radiating said last mentioned pulses towards an artificial satellite.

9. A colour television receiving ground station comprising: means for receiving from a satellite and detecting colour television pulse signals constituted by a carrier wave amplitude modulated by pulses comprising at the end of each scanning line a timing-pulse followed by a pulse coded line synchronization signal, at the end of each field a timing pulse followed by a pulse coded field synchronization signal, and, in the course of the scanning lines, successive sequences each comprising a pulse coded luminance signal and $n$ pulse coded colour signals, where $n$ is a positive integer smaller than three; the pulse constituting said pulse coded signals being shorter than said timing pulses; a duration-amplitude converter having an input coupled to said receiving and detecting means, for translating the pulses detected by said receiving and detecting means, and imparting to said timing pulses a higher level than to the others of said detected pulses; said duration-amplitude converter feeding an output circuit comprising a first output, a second output, a third output, and means for delivering all of said detected pulses to said first output, and respectively delivering said sequences of pulse coded signals to said second output and said pulse coded line and field synchronization signals to said third output; a frequency restorer coupled to said first output; a timing circuit controlled by said frequency restorer; decoding means, having an input coupled to said second output, and delaying means for restoring simultaneous decoded luminance and colour signals, said decoding means being controlled by said timing circuit; means for deriving from said pulse coded line and field synchronization signals first and second single pulse auxiliary signals; and means, controlled by said timing circuit and by means of said first and second auxiliary signals, for generating non coded field and line synchronization signals.

10. A colour television receiving ground station comprising: means for receiving from a satellite and detecting colour television pulse signals constituted by a carrier wave amplitude modulated by pulses comprising at the end of each scanning line a timing pulse followed by a pulse coded line synchronization signal, at the end of each field a timing pulse followed by a pulse coded field synchronization signal, and, in the course of the scanning lines, successive sequences, each comprising a pulse coded luminance signal and a pulse coded colour signal, where $n$ is a positive integer smaller than three; said timing pulses being duration-modulated in accordance with a sound signal and the pulses constituting said pulse coded signals being shorter than said timing pulses; a duration-amplitude converter having an input coupled to said receiving and detecting means, for translating the pulses detected by said receiving and detecting means, and imparting to said timing pulses a higher level than to the others of said detected pulses; said duration-amplitude converter feeding an output circuit comprising a first output, a second output, a third output, a fourth output and means for delivering all of said detected pulses to said first output, said sequences of pulse coded signals to said second output, said pulse coded line and field synchronization signals to said third output, and said timing pulses to said fourth output; a frequency restorer coupled to said first output; a timing circuit controlled by said frequency restorer; decoding means, having an input coupled to said second output, and delaying means for restoring simultaneous decoded luminance and colour signals, said decoding means being controlled by said timing circuit; means for deriving from said pulse coded line and field synchronization signals first and second single pulse auxiliary signals; means controlled by said timing circuit and by means of said first and second auxiliary signals for generating non coded field and line synchronization signals; and means, coupled to said fourth output, for duration-demodulating said timing pulses and deriving therefrom a sound signal.

11. A colour television transmission system comprising a transmitting ground station, a receiving ground station, and $p$ successive relay stations, where $p$ is a positive integer, aboard respective artificial satellites, between said transmitting ground station and said receiving ground station;

said transmitting station comprising: means for deriving a luminance signal and $n$ colour signals, where $n$ is a positive integer smaller than three, relative to a scene to be televized; a timing circuit; sampling, quantizing and encoding means, controlled by said timing circuit, for deriving from said signals a first series of pulse coded signals carrying luminance information and $n$ other series of pulse coded signals respectively carrying $n$ colour information; means for time positioning said pulse coded signals to derive therefrom successive sequences, each sequence comprising a pulse coded signal of the first series and a pulse coded signal of each of said other series; means, controlled by said timing circuit, for generating a timing pulse at the end of each scanning line and at the end of each scanning field; means for generating, after each timing pulse following a scanning line, a pulse coded line synchronization signal, and, after each timing pulse following a scanning field, a pulse coded field synchronization signal; mixing means fed with said timing pulses and with said pulse coded signals for delivering a complex signal; means for modulating said complex signal on a carrier wave to obtain pulses of high frequency oscillations, and means for radiating said last mentioned pulses towards one of said artificial satellites;

each of said satellites comprising: means for receiving pulses of high frequency oscillations derived from the modulation of a carrier wave by said complex signal; means for detecting the received pulses; means for regenerating the detected pulses; means for modulating a carrier wave by the generated pulses to obtain new pulses of high frequency oscillations; and means for retransmitting said new pulses;

said receiving station comprising: means for receiving pulses of high frequency oscillations derived from the modulation of a carrier wave by said complex signal; means for detecting said last mentioned pulses; a duration-amplitude converter having an input coupled to said detecting means, for translating the pulses detected by said detecting means, and imparting to said timing pulses a higher level than to the others of said detected pulses; said duration-amplitude converter feeding an output circuit comprising a first output, a second output, a third output, and means for delivering all of said last mentioned detected pulses to said first output, and for respectively delivering said sequences of pulse coded signals to said second output and said pulse coded line and field synchronization signals to said third output; a frequency restorer coupled to said first output; a timing circuit controlled by said frequency restorer; decoding means, having an input coupled to said second output, and delaying means for restoring simultaneous decoded luminance and colour signals, said decoding means being controlled by said timing circuit; means for deriving from said pulse coded line and field synchronization signals first and second single pulse auxiliary signals; and means, controlled by said timing circuit and by means of said first and second auxiliary signals, for generating non coded field and line synchronization signals.

References Cited by the Examiner

UNITED STATES PATENTS

| | | | |
|---|---|---|---|
| 2,626,348 | 1/1943 | Nobles | 325—4 |
| 2,748,266 | 5/1956 | Boyd | 325—4 |
| 2,949,605 | 8/1960 | Graziano et al. | 178—5 |
| 3,095,538 | 6/1963 | Silberstein | 325—4 |

DAVID G. REDINBAUGH, *Primary Examiner.*

ROBERT SEGAL, *Examiner.*

J. A. O'BRIEN, *Assistant Examiner.*